US008397105B2

(12) United States Patent
Nakajima et al.

(10) Patent No.: US 8,397,105 B2
(45) Date of Patent: Mar. 12, 2013

(54) COMPUTER SYSTEM OR PERFORMANCE MANAGEMENT METHOD OF COMPUTER SYSTEM

(75) Inventors: Jun Nakajima, Kawasaki (JP); Daisuke Shinohara, Yokohama (JP); Yuri Hiraiwa, Sagamihara (JP); Nobuyuki Osaki, Yokohama (JP); Nobuhiro Maki, Yokohama (JP); Takayuki Nagai, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/170,409

(22) Filed: Jun. 28, 2011

(65) Prior Publication Data

US 2011/0258402 A1 Oct. 20, 2011

Related U.S. Application Data

(63) Continuation of application No. 11/968,687, filed on Jan. 3, 2008, now Pat. No. 7,996,728.

(30) Foreign Application Priority Data

Jun. 5, 2007 (JP) ................................ 2007-148738

(51) Int. Cl.
*G06F 11/00* (2006.01)
(52) U.S. Cl. ...................................... 714/47.1; 709/224
(58) Field of Classification Search .................. 714/47.1
See application file for complete search history.

(56) References Cited

U.S. PATENT DOCUMENTS

| 7,031,988 | B2 | 4/2006 | Kusama et al. |
| 7,089,347 | B2 | 8/2006 | Mogi et al. |
| 7,127,555 | B2 | 10/2006 | Takeda et al. |
| 7,392,314 | B2* | 6/2008 | Betzler et al. ................. 709/226 |
| 7,415,629 | B2* | 8/2008 | Mikami ........................ 714/6.1 |
| 7,430,637 | B2* | 9/2008 | Mikami ........................ 711/118 |
| 8,024,613 | B2* | 9/2011 | Ochi et al. ...................... 714/30 |
| 8,028,199 | B1* | 9/2011 | Guruprasad et al. ............ 714/43 |
| 2004/0059544 | A1* | 3/2004 | Smocha et al. ............... 702/182 |
| 2006/0182050 | A1 | 8/2006 | Dohm |
| 2006/0212667 | A1* | 9/2006 | Mikami ........................ 711/162 |
| 2006/0212719 | A1 | 9/2006 | Miyawaki et al. |
| 2006/0236048 | A1 | 10/2006 | Deguchi et al. |
| 2007/0106861 | A1 | 5/2007 | Miyazaki et al. |
| 2007/0162717 | A1* | 7/2007 | Mikami ........................ 711/162 |
| 2008/0201720 | A1* | 8/2008 | Betzler et al. ................. 718/105 |
| 2008/0307271 | A1* | 12/2008 | Nakajima et al. .............. 714/47 |
| 2009/0235269 | A1* | 9/2009 | Nakajima et al. ............. 718/104 |

(Continued)

FOREIGN PATENT DOCUMENTS

EP 1507206 A2 10/2006
JP 2006259976 9/2006

*Primary Examiner* — Kamini Patel
(74) *Attorney, Agent, or Firm* — Brundidge & Stanger, P.C.

(57) ABSTRACT

This invention provides a system including a computer and a storage-subsystem comprising at least either a first storage area for storing data sent from the computer or a second storage area to be associated with the first storage area, for storing replicated data of data stored in the first storage area. This system includes a replication processing status referral unit for referring to a replication processing status of data of the first storage area and the second storage area to be associated, and an output unit for outputting first performance information concerning data I/O stored in the first storage area, and outputting second performance information concerning data I/O stored in the second storage area together with the first performance information when the replicated data is being subject to replication processing from the first storage area to the second storage area as a result of referring to the replication processing status.

10 Claims, 39 Drawing Sheets

U.S. PATENT DOCUMENTS

2010/0094990 A1* 4/2010 Ben-Yehuda et al. ........ 709/224
2011/0258402 A1* 10/2011 Nakajima et al. ............. 711/154
2011/0295655 A1* 12/2011 Tsuji et al. ................... 705/7.38
2011/0295993 A1* 12/2011 Ochi et al. .................... 709/223

* cited by examiner

FIG.5

| | 12402 | 12403 | 12404 | 12405 | 12406 | 12407 12401 |
|---|---|---|---|---|---|---|
| | HOST COMPUTER | VOLUME NUMBER | STORAGE NAME | DATA INTERFACE NUMBER | LOGICAL VOLUME NUMBER | RAID GROUP NUMBER |
| | HOST COMPUTER A | Vol-A | STORAGE A | p1 | lv1 | RG1 |
| | HOST COMPUTER A | Vol-B | STORAGE A | p2 | lv2 | RG1 |
| | HOST COMPUTER B | Vol-C | STORAGE B | p3 | lv3 | RG2 |
| | − | − | STORAGE B | p4 | lv4 | RG3 |

FIG.6

| STORAGE NAME | LOGICAL VOLUME NUMBER | PS | COPY CONFIGURATION OF OPPONENT ||
|---|---|---|---|---|
| | | | COPY OPPONENT STORAGE NAME | COPY OPPONENT LOGICAL VOLUME NUMBER |
| STORAGE A | lv1 | REPLICATION SOURCE | STORAGE B | lv3 |
| STORAGE A | lv2 | REPLICATION SOURCE | STORAGE B | lv4 |
| STORAGE B | lv3 | REPLICATION DESTINATION | STORAGE A | lv1 |
| STORAGE B | lv4 | REPLICATION DESTINATION | STORAGE A | lv2 |

FIG.7

| HOST COMPUTER | VOLUME NUMBER | STORAGE NAME | DATA INTERFACE NUMBER | LOGICAL VOLUME NUMBER | RAID GROUP | COPY OPPONENT STORAGE NAME | COPY OPPONENT VOLUME NUMBER |
|---|---|---|---|---|---|---|---|
| HOST COMPUTER A | Vol-A | STORAGE A | p1 | lv1 | RG1 | STORAGE B | lv3 |
| HOST COMPUTER A | Vol-B | STORAGE A | p2 | lv2 | RG1 | STORAGE B | lv4 |
| HOST COMPUTER B | Vol-C | STORAGE B | p3 | lv3 | RG2 | STORAGE A | lv1 |
| – | – | STORAGE B | p4 | lv4 | RG3 | STORAGE A | lv2 |

FIG.8

| STORAGE NAME | LOGICAL VOLUME NUMBER | IO Response Time | Read IO Response Time | Write IO Response Time |
|---|---|---|---|---|
| STORAGE A | lv1 | 45 | 40 | 50 |
| STORAGE A | lv2 | 15 | 10 | 20 |

FIG.9

| COPY CONFIGURATION NAME | REPLICATION SOURCE | | REPLICATION DESTINATION | | COPY STATUS |
|---|---|---|---|---|---|
| | STORAGE NAME | LOGICAL VOLUME NUMBER | STORAGE NAME | LOGICAL VOLUME NUMBER | |
| PAIR 1 | STORAGE A | lv1 | STORAGE B | lv3 | SYNCHRONIZED |
| PAIR 2 | STORAGE A | lv2 | STORAGE B | lv4 | SUSPENDED |

FIG.10

| STORAGE NAME | LOGICAL VOLUME NUMBER | CORRELATION SOURCE STORAGE NAME | CORRELATION SOURCE LOGICAL VOLUME NUMBER | THRESHOLD VALUE OF IO RESPONSE TIME | THRESHOLD VALUE OF READ IO RESPONSE TIME | THRESHOLD VALUE OF WRITE IO RESPONSE TIME |
|---|---|---|---|---|---|---|
| STORAGE A | lv1 | - | - | 30 | 30 | 25 |
| STORAGE B | lv2 | - | - | 10 | 10 | 10 |
|  |  | STORAGE A | lv1 | 30 | 30 | 25 |

FIG.20

| COPY CONFIGURATION NAME | REPLICATION SOURCE | | REPLICATION DESTINATION | | COPY STATUS | COPY TYPE | SIDE FILE | CONSISTENCY GROUP NAME |
|---|---|---|---|---|---|---|---|---|
| | STORAGE NAME | LOGICAL VOLUME NUMBER | STORAGE NAME | LOGICAL VOLUME NUMBER | | | | |
| PAIR 1 | STORAGE A | lv1 | STORAGE B | lv3 | SYNCHRONIZED | SYNCHRONOUS COPY | – | – |
| PAIR 2 | STORAGE A | lv2 | STORAGE B | lv4 | SYNCHRONIZED | ASYNCHRONOUS COPY | WRITING | CG1 |

FIG.21

| CONSISTENCY GROUP NAME | LOGICAL VOLUME | |
|---|---|---|
| | STORAGE NAME | LOGICAL VOLUME NUMBER |
| CG1 | STORAGE A | lv2, lv5 |
| | STORAGE C | lv9 |
| CG2 | STORAGE A | lv6 |

FIG.34

| HOST COMPUTER | VOLUME NUMBER | STORAGE NAME | DATA INTERFACE NUMBER | LOGICAL VOLUME NUMBER (VIRTUAL) | STORAGE NAME | RAID GROUP NUMBER |
|---|---|---|---|---|---|---|
| HOST COMPUTER A | Vol-A | VIRTUAL STORAGE A | p1 | v1 | STORAGE SUBSYSTEM A | RG1 |
| | | VIRTUAL STORAGE B | p2 | v2 | STORAGE SUBSYSTEM A | RG2 |

| HOST COMPUTER | VOLUME NUMBER | STORAGE NAME | DATA INTERFACE NUMBER | LOGICAL VOLUME NUMBER (VIRTUAL) | RAID GROUP | COPY OPPONENT STORAGE NAME | COPY OPPONENT STORAGE NAME (VIRTUAL) |
|---|---|---|---|---|---|---|---|
| HOST COMPUTER A | Vol-A | VIRTUAL STORAGE A | p1 | vv1 | RG1 | STORAGE B | vv2 |
| | | VIRTUAL STORAGE B | p2 | vv2 | RG2 | STORAGE A | vv1 |

| 42301 | 42302 | 42303 | 42304 | 42305 42300 |
|---|---|---|---|---|
| HOST COMPUTER | VOLUME NUMBER | STORAGE NAME | DATA INTERFACE NUMBER | LOGICAL VOLUME NUMBER (VIRTUAL) |
| HOST COMPUTER A | Vol-A | VIRTUAL STORAGE A | p1 | vv1 |
| HOST COMPUTER A | Vol-B | VIRTUAL STORAGE A | p1 | vv5 |

# COMPUTER SYSTEM OR PERFORMANCE MANAGEMENT METHOD OF COMPUTER SYSTEM

CROSS REFERENCE TO RELATED APPLICATIONS

The present application is a continuation of application Ser. No. 11/968,687, filed Jan. 3, 2008, now U.S. Pat. No. 7,996,728; which relates to and claims priority from Japanese Patent Application No. 2007-148738, filed Jun. 5, 2007, the entire disclosure of which is incorporated herein by reference.

BACKGROUND OF THE INVENTION

The technology disclosed in this specification generally relates to performance management of a computer system, and in particular relates to a method and apparatus for managing the performance of a storage subsystem.

As technology concerning the performance management of a computer system, U.S. Pat. No. 7,127,555 (Patent Document 1) discloses technology of acquiring performance information of the respective resources in a computer system, referring to a mapping table between the resources, and narrowing the performance information of resources to be output.

Further, U.S. Pat. No. 7,031,988 (Patent Document 2) discloses a storage used capacity display method where a system comprising a host computer and a storage subsystem configured from a plurality of volumes acquires the capacity of each volume, setting information concerning the copy between volumes being executed in the storage subsystem, and setting information concerning the copy between the storage subsystems, and associates information collected based on setting information concerning the copy so as to display a list of storage subsystems used by the designated host computer as well as the total capacity and used capacity of volumes on a display module.

SUMMARY OF THE INVENTION

In Patent Document 2, the used capacity is output based on the mapping information of the host computer and storage, and setting information concerning the copy. Further, in Patent Document 1, the performance information of the associated host computer and storage is output based on the mapping information set between the host computer and storage.

Nevertheless, depending on the status between the associated resources, there are cases where the completion of I/O processing from a certain host computer will and will not depend on the performance of the associated resources. For example, there are cases where the I/O response is returned merely by writing data into a specified resource in response to the I/O request from the computer. In addition, there are cases where the I/O response is returned after transfer to another resource or replication of an I/O request in a setting where a specified resource is associated with another resource, and cases where the I/O request is returned unrelated to the transfer to another resource or replication of an I/O request even in a setting where a specified resource is associated with another resource.

Therefore, when the performance of associated resources is output regardless of the status of performance correlation, there are cases when the performance of a resource that is unrelated to the I/O from the computer is output at a certain point in time, and the administrator is not able to efficiently operate the performance management. Meanwhile, when the performance of a certain resource is output regardless of the performance correlation or association between resources, it is not possible to give consideration to the I/O response time in a volume of the replication destination or the access response time in a physical storage device of a storage of the replication destination having performance correlation, and it will be difficult to grasp the performance management of the computer system.

In order to overcome at least one of the foregoing problems, one mode of the present invention provides a computer system including a computer and a storage subsystem comprising at least either a first storage area for storing data sent from the computer or a second storage area to be associated with the first storage area and for storing replicated data of data stored in the first storage area. This computer system further includes a replication processing status referral unit for referring to a replication processing status of data of the first storage area and the second storage area to be associated, and an output unit for outputting first performance information concerning data I/O stored in the first storage area, and outputting second performance information concerning data I/O stored in the second storage area together with the first performance information when the replicated data is being subject to replication processing from the first storage area to the second storage area as a result of referring to the replication processing status.

According to an embodiment of the present invention, it is possible to alleviate the burden of an administrator in charge of managing the performance of the computer system.

BRIEF DESCRIPTION OF THE DRAWINGS

FIG. 5 is a diagram showing an example of a table illustrating configuration information of a computer system to be stored in a configuration information repository retained by the performance monitoring computer according to an embodiment of the present invention;

FIG. 6 is a diagram showing an example of a table illustrating copy configuration information to be stored in the configuration information repository retained by the performance monitoring computer according to an embodiment of the present invention;

FIG. 7 is a diagram showing an example of a table illustrating SAN configuration information containing copy configuration information to be stored in the configuration information repository retained by the performance monitoring computer according to an embodiment of the present invention;

FIG. 8 is a diagram showing an example of a table illustrating performance information of a computer system to be stored in the performance information repository retained by the performance monitoring computer according to an embodiment of the present invention;

FIG. 9 is a diagram showing an example of a copy status table retained by the performance monitoring computer according to an embodiment of the present invention;

FIG. 10 is a diagram showing an example of a status-based threshold value management table retained by the performance monitoring computer according to an embodiment of the present invention;

FIG. 20 is a diagram showing an example of a copy configuration type/status table retained by the performance monitoring computer according to a modified example of the present invention;

FIG. 21 is a diagram showing an example of a consistency group management table retained by the performance monitoring computer according to a modified example of the present invention;

FIG. 34 is a diagram showing an example of a table illustrating SAN configuration information to be stored in a configuration information repository retained by a performance monitoring computer according to still another modified example of the present invention;

FIG. 35 is a diagram showing an example of a table showing SAN configuration information to be stored in the configuration information repository retained by the performance monitoring computer according to still another modified example of the present invention;

FIG. 36 is a diagram showing an example of an alternative path status table retained by the host computer according to still another modified example of the present invention;

DETAILED DESCRIPTION OF THE DRAWINGS

Representative embodiments of the present invention are now explained with reference to the attached drawings. The present invention, however, shall not be limited by these embodiments in any way.

First Embodiment

Figure 1:
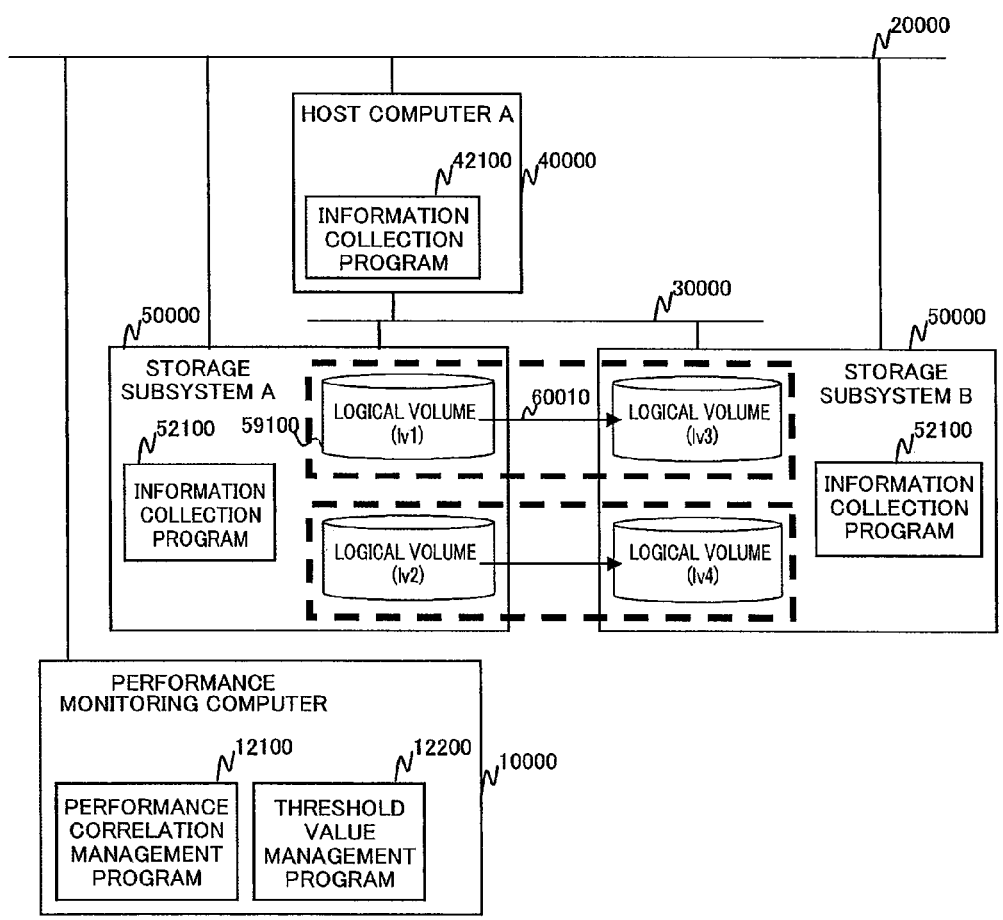
FIG. 1 is a diagram showing a configuration example of a computer system according to an embodiment of the present invention.

A configuration example of a computer system according to this embodiment is foremost explained. FIG. 1 shows the configuration example of the computer system of this embodiment. The computer system comprises one or more host computers (computers) including an information collection program, one or more storage subsystems including an information collection program and retaining a copy function, and one or more performance monitoring computers including a performance correlation management program and a threshold value management program. In this embodiment, the information collection programs of the host computer and the storage subsystem are retained in the host computer and the storage subsystem, but these may also be operated in a separate host computer for performing such information collection programs.

For the sake of convenience in the ensuing explanation, let it be assumed that, with the computer system of this embodiment, one host computer (host computer A) 40000 and two storage subsystems (storage subsystem A, storage subsystem B) 50000 retaining a copy function are mutually connected via a fibre channel 30000. In FIG. 1, logical volumes lv1 (591000), lv2 (592000) of the storage subsystem A are provided to the host computer A40000. Further, based on the copy function, the logical volume lv1 of the storage subsystem A and the logical volume lv3 of the storage subsystem B are associated, and the logical volume lv2 of the storage subsystem A and the logical volume lv4 of the storage subsystem B are associated, respectively, and set with copy configuration definition 60010. In this embodiment, I/O from the host computer to the replication source logical volume set with the copy configuration information will be synchronous copy configuration definition where the write I/O in the host computer becomes complete after waiting for the completion of the write I/O in the replication destination logical volume set with the copy configuration information; that is, mirroring to the replication source logical volume and the replication destination logical volume is performed. In this embodiment, although the volume of the copy source and the volume of the copy destination are placed in separated storage subsystems, the volume of the copy source and the volume of the copy destination may also exist in the same storage subsystem.

As examples of the status of copy configuration when the copy configuration information is set, there are "synchronized," "suspended" and the like. "Synchronized" shows a status where the replication source volume and the replication destination volume are synchronized, and data of the replication source volume and data of the replication destination volume coincide. "Suspended" shows a status when the synchronization of data of the replication source volume and the replication destination volume is being suspended. In this embodiment, let it be assumed that [the logical volumes] lv1 and lv3 are in a synchronized status, and [the logical volumes] lv2 and lv4 are in a suspended status.

The write I/O from the host computer A to the logical volume lv1 is sent to the logical volume lv1 via the fibre channel 30000, and the write I/O to the [the logical volume] lv1 is sent to the logical volume lv3 via the fibre channel 30000. The write I/O in the host computer A becomes complete after waiting for the completion of the write I/O in the logical volume lv3. Further, the write I/O from the host computer A to the logical volume lv2 is sent to the logical volume lv2 via the fibre channel 30000, and the write I/O in the host computer A becomes complete after waiting for the completion of the write I/O in the logical volume lv2.

Incidentally, the connection configuration of the host computer A to the storage subsystem A and the storage subsystem B does not have to be a direct connection using the fibre channel 30000 as shown in FIG. 1, and may be connected via a network apparatus such as one or more fibre channel switches. Further, although the fibre channel 30000 was used in this embodiment for connecting the host computer A to the storage subsystem A and the storage subsystem B, a separate network may be used so as long as it is a data communication network, and, for instance, an IP network may also be used.

The performance monitoring computer 10000 (management computer) is connected to the host computer A, the storage subsystem A, and the storage subsystem B via the management network 20000, and communicates with the information collection program of each apparatus. The performance correlation management program 12100 performs performance correlation management processing, performance correlation presentation processing and so on based on the processing routines described later. The threshold value management program 12200 performs threshold value setting processing of performance monitoring according to the copy status and alert notice processing resulting from making changes to the performance monitoring target and the threshold value of performance monitoring based on the processing routines described later.

Figure 2:
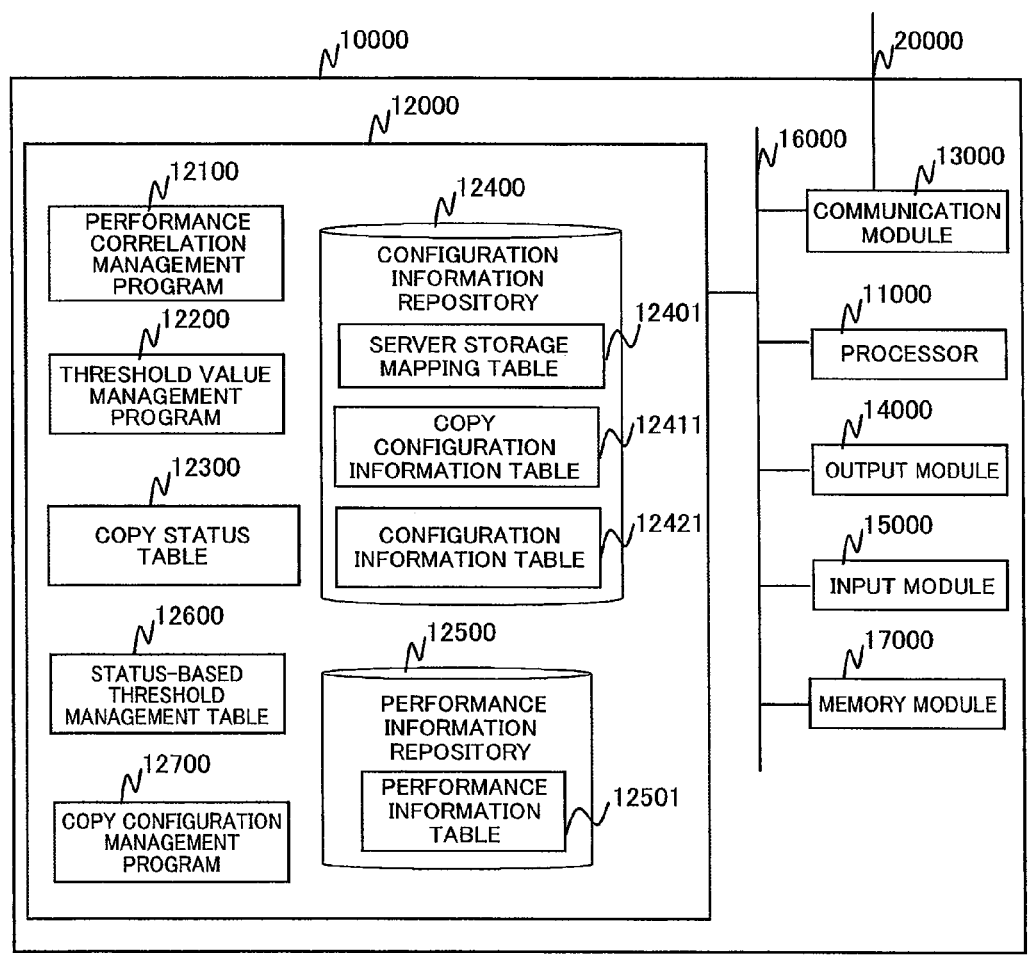
FIG. 2 is a diagram showing a configuration example of a performance monitoring computer according to an embodiment of the present invention.

FIG. 2 shows a configuration example of the performance monitoring computer 10000. The performance monitoring computer 10000 comprises a processor 11000, a memory 12000, a communication module 13000 for connecting to the management network 20000, an output module 14000 such as a display apparatus for outputting the execution results of processing based on the performance correlation program 12100, an input module 15000 such as a keyboard for the administrator to input commands into the threshold value management program 12200, and a memory module 17000, and these components are mutually connected via a communication path 16000 such as an internal bus.

The memory 12000 stores programs to be executed by the performance monitoring computer including a performance correlation management program 12100, a threshold value management program 12200, and a copy configuration management program 12700, a copy status table 12300 for retaining status information of the copy configuration between the logical volumes in which the copy configuration is being defined, a configuration information repository 12400 and a performance information repository 12500 as areas for storing information collected from the information collection programs managing the respective apparatuses in the computer system, and a status-based threshold value management table 12600 for retaining the threshold value set in accordance with the status of copy configuration. Further, the configuration information repository 12400 stores a server storage mapping table 12401 for retaining the correspondence of the host computer and the logical volumes mounted in the host computer, a copy configuration information table 12411 for retaining the relationship of the copy configuration of the associated logical volumes, and a configuration information table 12421 for retaining configuration information of the computer system including the copy configuration information. Moreover, the performance information repository 12500 stores a performance information table 12501 for retaining performance information of the apparatuses contained in the computer system and the resources of such apparatuses.

The processor 10000 reads and executes programs stored in the memory 12000, refers to the tables stored in the memory 12000, and performs update processing.

In this embodiment, although the copy configuration management program 12700 is stored in the memory 12000 of the performance monitoring computer 10000, for instance, this may also be operated in the memory 42000 of the host computer 40000 or in the memory 52000 of the storage subsystem 50000, or operated in a separate host computer. Further, although the respective programs and tables described above are also stored in the memory 12000, the foregoing programs and tables may also be stored in the memory module 17000 or a separate storage medium, and the processor 11000 may read such programs and tables into the memory 12000 upon execution thereof to perform processing. These programs and tables may also be retained in a separate host computer or a storage subsystem.

Figure 3:
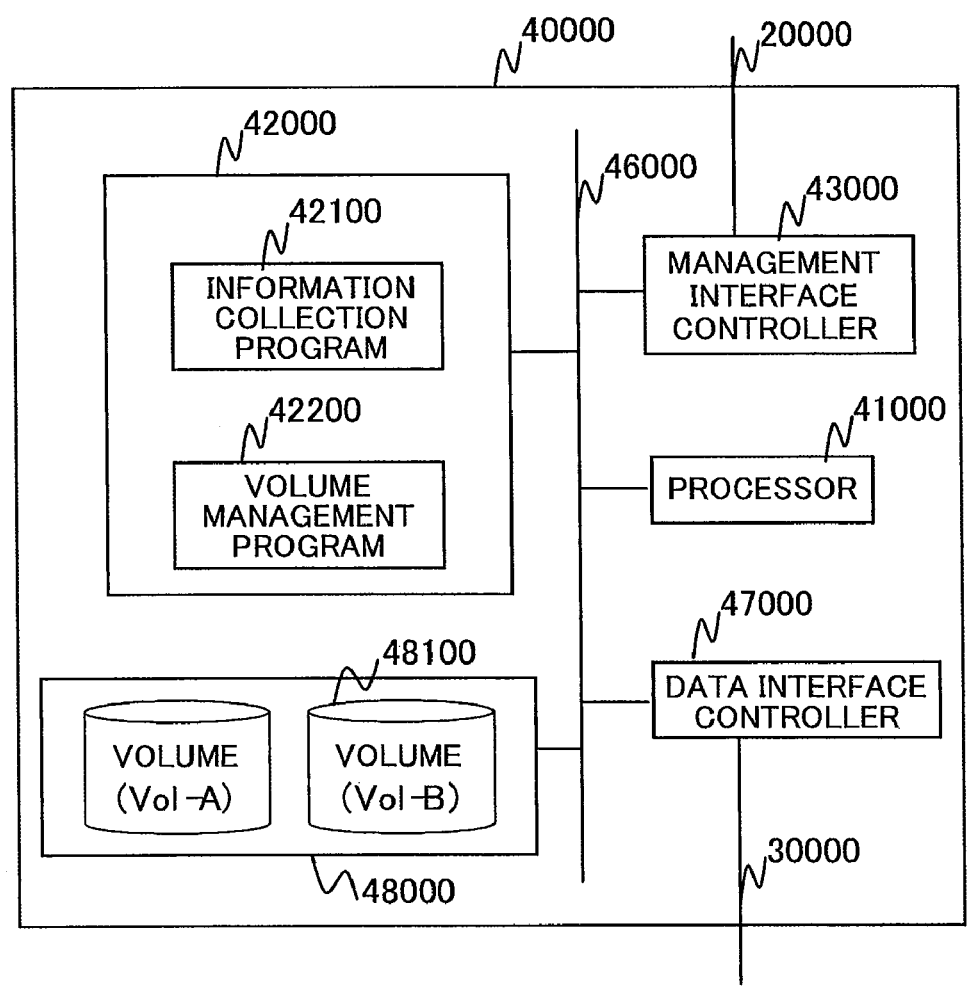
FIG. 3 is a diagram showing a configuration example of a host computer according to an embodiment of the present invention.

FIG. 3 shows a configuration example of the host computer 40000. The host computer 40000 comprises a processor 41000, a memory 42000, a management interface controller 43000 for connecting to the management network 20000, one or more data interface controllers 47000 for connecting to the fibre channel 30000, and a memory module 48000, and these components are mutually connected via a communication path 46000 such as an internal bus.

The memory 42000 stores an information collection program 42100 as a program for sending and receiving management information and performance information of the host computer by communicating with the performance monitoring computer, and a volume management program 42200 as a program for mounting the volumes made available from the storage subsystem 50000 on the host computer.

The volume management program 42200 mounts the logical volumes being provided to the computer system from the storage subsystem A onto the volume 48100 in the memory module 48000 of the host computer A, and enables the use of the logical volumes being provided to the computer system from the business program in the host computer A and from the storage subsystem A.

Incidentally, although in this embodiment a case is explained where there is only one host computer; namely, the host computer A, and only one data interface controller in the host computer A, the number of host computers and the number of data interface controllers may be any number. Further, although the [programs] 42100, 42200 are stored in the memory 42000, these programs may also be stored in a separate memory module or a separate storage medium, and the processor 41000 may read such programs and tables into the memory 42000 upon execution thereof to perform processing. These programs and tables may also be retained in a separate host computer or a storage subsystem.

Figure 4:
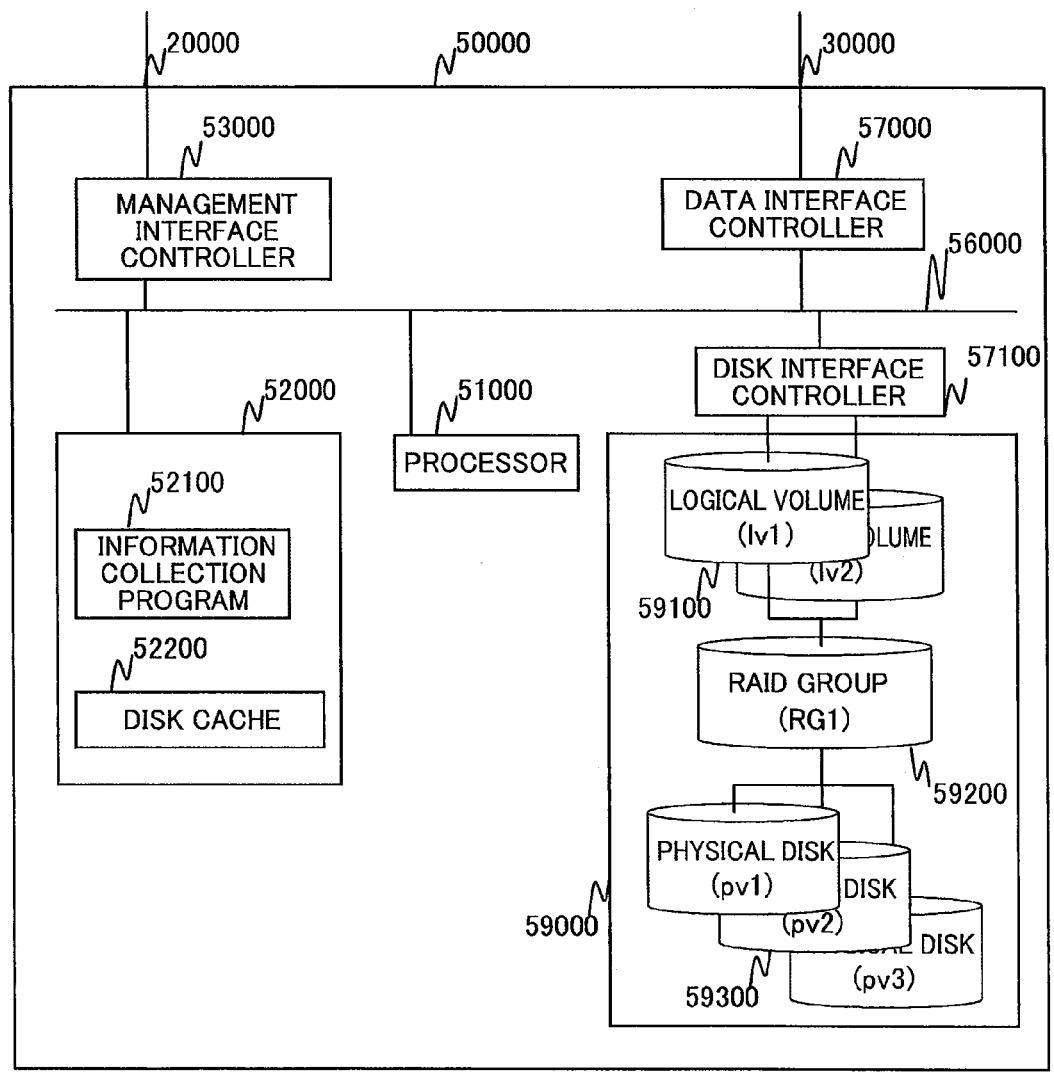
FIG. 4 is a diagram showing a configuration example of a storage subsystem according to an embodiment of the present invention.

FIG. 4 shows a configuration example of the storage subsystem 50000. The storage subsystem 50000 comprises a processor 51000, a memory 52000, a management interface controller 53000 for connecting to the management network 20000, a data interface controller 57000 for connecting to the fibre channel 30000, a disk interface controller 57100, and a logical volume provision unit 59000 for providing data storage areas, and these components are mutually connected via a communication path 56000 such as an internal bus.

The memory 52000 stores an information collection program 52100 as a program for sending and receiving management information and performance information of the storage subsystem by communicating with the performance monitoring computer, and a disk cache 52200. The logical volume provision unit 59000 logically partitions the RAID group 59200 created from a plurality of physical disks 59300 and provides them as logical volumes 59100 so as to enable access to such logical volumes from outside the storage subsystem.

Incidentally, although the illustrated example shows a case where there are two storage subsystems; namely storage subsystem A and storage subsystem B, one data interface controller in the storage subsystem, and one disk interface controller in the storage subsystem, the number of storages, the number of data interface controllers and the number of disk interface controllers may be any number. Further, although the programs 52100, 52200 are stored in the memory 52000, these programs may also be stored in a separate memory module or a separate storage medium, and the processor 51000 may read such programs and tables into the memory 52000 upon execution thereof to perform processing. These programs and tables may also be retained in a separate host computer or a storage subsystem.

FIG. 5 shows an example of a server storage mapping table 12401 to be stored in the configuration information repository 12400 retained by the performance monitoring computer 10000. This table stores information concerning each volume in each host computer as to which logical volume and which RAID group it corresponds to via which data interface of the storage subsystem. The server storage mapping table 12401 is a table to which a record is added by the performance correlation management program 12100. A value for uniquely identifying the host computer is registered in the host computer column 12402 of the server storage mapping table 12401, a value for uniquely identifying the volumes in the host computer is registered in the volume number column 12403, a value for uniquely identifying the storage subsystem being used by the respective volumes of the volume number column is registered in the storage name column 12404, a value for uniquely identifying the number of the data interface being used by the respective volumes of the volume number column is registered in the data interface number column 12405, a value for uniquely identifying the logical volumes being used by the respective volumes of the volume number column is registered in the logical volume number column 12406, and a value for uniquely identifying the RAID groups being used by the respective volumes of the volume number column is registered in the RAID group column 12407. Incidentally, entries registered as "-" in the volume number column show that no storage is allocated to the host computer.

FIG. 6 shows an example of a copy configuration information table 12411 to be stored in the configuration information repository 12400 retained by the performance monitoring computer 10000. This table stores the correspondence of the replication source logical volume and the replication destination logical volume of each piece of copy configuration information. The copy configuration information table 12411 is a table to which a record is added by the performance correlation management program 12100. A value for uniquely identifying the storage is registered in the storage name column 12412 of the copy configuration information table 12411, a value for uniquely identifying the logical volumes is registered in the logical volume number column 12413, a value showing whether the logical volumes of the logical volume column is a replication source volume of copy configuration or a replication destination volume of copy configuration is registered in the PS column 12414, a value for uniquely identifying the storages of the copy destination is registered in the copy opponent storage name column 12415, and a value for uniquely identifying the logical volumes of the copy destination is registered in the copy destination logical volume number column 12416.

FIG. 7 shows an example of a configuration information table 12421 illustrating the SAN configuration information containing copy configuration information to be stored in the configuration information repository 12400 retained by the performance monitoring computer 10000. Each column of the configuration information table 12421 is a result of merging the respective columns of FIG. 5 and FIG. 6, and the same values are stored therein.

FIG. 8 shows an example of a performance information table 12501 showing the SAN performance information to be stored in the performance information repository 12500 retained by the performance monitoring computer 10000. This table stores performance information such as each volume in each host computer, the logical volumes of each storage subsystem, the RAID group of each storage subsystem and the like. The performance information table 12501 is a table to which a recorded is added by the performance correlation management program 12100. A value for uniquely identifying the storages is registered in the storage name column 12502 of the performance information table 12501, a value for uniquely identifying the logical volumes is registered in the logical volume number column 12503, a response time to the I/O to the logical volumes is registered in the I/O Response Time column 12504, a response time to the read I/O to the logical volumes is registered in the Read I/O Response Time column 12505, and a response time to the write I/O to the logical volumes is registered in the Write I/O Response Time column 12506. In this embodiment, although the IO Response Time, the Read I/O Response Time, and the Write I/O Response Time were listed as examples of performance information, other performance information such as IO Per Second, Read IO Per Second, Write IO Per Second or Transfer Rate, Read Transfer Rate, Write Transfer Rate and the like may also be retained.

FIG. 9 shows an example of the copy status table 12300 retained by the performance monitoring computer 10000.

This table stores the pair status of the replication source logical volume and the replication destination logical volume of each piece of copy configuration information. The copy status table 12300 is a table to which a record is added by the performance correlation management program 12100.

A value for uniquely specifying the copy configuration in the storage subsystem comprising the copy source volume and the storage subsystem comprising the copy destination volume is registered in the copy configuration name column 12301 of the copy status table. A value for uniquely identifying the storages is registered in the replication source storage name column 12302 and the replication destination storage name column 12304. A value for uniquely identifying the logical volumes is registered in the replication source logical volume number column 12303 and the replication destination logical volume number column 12305. A copy configuration status such as synchronized or suspended is registered in the copy configuration status column 12306.

FIG. 10 shows an example of a status-based threshold value management table 12600 retained by the performance monitoring computer 10000. This table stores the threshold values of performance set for each status to each resource. The status-based threshold value management table 12600 is a table to which a record is added by the threshold value management program 12100. A value for uniquely identifying the storage subsystems comprising the logical volumes of the copy destination is registered in the storage name column 12601 of the status-based threshold value management table. A value for uniquely identifying the logical volumes in the storages shown in the storage name column is registered in the logical volume number column 12602. A value for uniquely identifying the storage subsystems comprising the logical volumes to become the copy source of the logical volumes shown in the logical volume column of the storage shown in the storage name column is registered in the correlation source storage name column 12603. A value for uniquely identifying the logical volumes to become the copy source of the logical volumes shown in the logical volume column 12602 of the storages shown in the storage name column 12601 is registered in the correlation source logical volume number column 12604. A threshold value requested as the response time to the I/O to the logical volumes is registered in the IO Response Time threshold value column 12605. A threshold value requested as the response time to the read I/O to the logical volumes is registered in the Read IO Response Time threshold value column 12606. A threshold value requested as the response time to the write I/O to the logical volumes is registered in the Write IO Response Time threshold value column 12607. Incidentally, the entries in which "-" is registered in the correlation source storage name and the correlation source logical volume number show that the threshold value is not a threshold value based on the status of the copy configuration relationship, but is a threshold value set to the resource by the SAN administrator.

The related table creation processing to be implemented by the performance correlation management program 12100 in the performance monitoring computer 10000 is now explained. This processing is periodically executed by the processor 11000 of the performance monitoring computer 10000 executing the program stored in the memory 12000, and is performed to create a related table for specifying the latest performance correlation including the copy configuration status in the SAN environment. Unless otherwise specified herein, each step shall be performed by the processor 11000.

Figure 11:
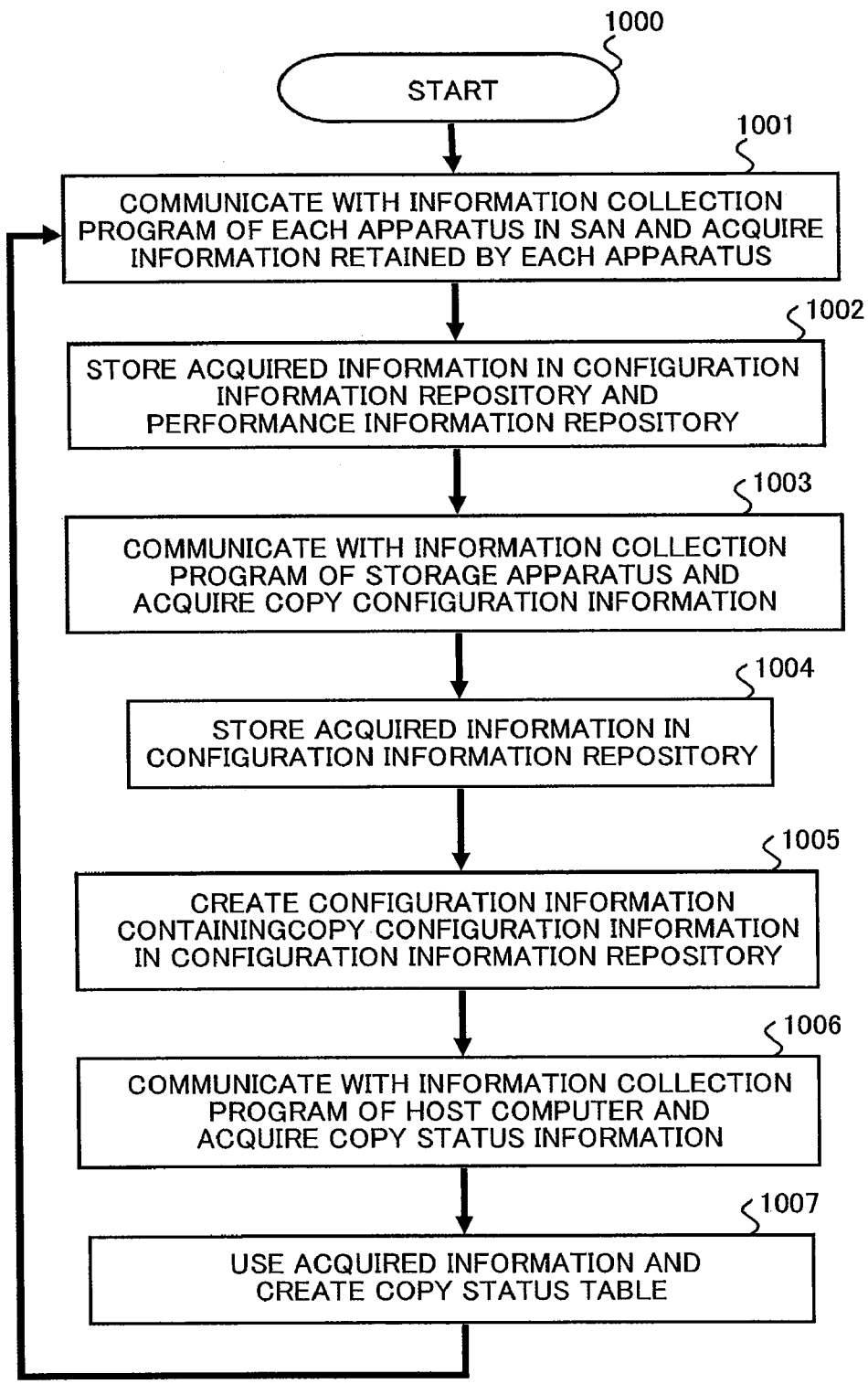
FIG. 11 is a flowchart showing an example of related table creation processing of a performance correlation management program according to an embodiment of the present invention.

FIG. 11 shows a flowchart 1000 illustrating the outline of the related table creation processing to be executed by the processor 11000 that read the performance correlation management program 12100. The processor 11000 acquires information retained by each apparatus by communicating with the information collection program of each apparatus (step 1001). Subsequently, the processor 11000 stores the information acquired at step 1001 in the server storage mapping table of the configuration information repository and the performance information table of the performance information repository (step 1002). The processor 11000 thereafter communicates with the information collection program of the storage subsystem and acquires the copy configuration information (step 1003). Then, the processor 11000 stores the information acquired at step 1003 in the server storage mapping table of the configuration information repository (step 1004). In addition, the processor 11000 refers to the information in the configuration information repository and creates a configuration information table, which is configuration information containing the copy configuration information, in the configuration information repository (step 1005). The processor 11000 thereafter communicates with the information collection program of the host computer and acquires the copy configuration status information (step 1006). Finally, the processor 11000 uses each piece of information acquired at step 1006 to create a copy status table (step 1007).

In this embodiment, although the acquisition of the copy configuration information and copy configuration status is periodically repeated simultaneously with the acquisition of the configuration information and performance information, the copy status table may be created by monitoring changes in the copy configuration information and copy configuration status. Further, in this embodiment, although the timing of the performance correlation management program acquiring the configuration information from the information collection program of each apparatus and storing the configuration information in the server storage mapping table in the configuration information repository, and the timing of the performance correlation management program acquiring the performance information from the information collection program of each apparatus, collecting the performance information, and storing the performance information in the performance information table of the performance information repository are the same, this timing may also be different.

At the server storage mapping table and performance information table creation step 1002, the processor 11000 creates a new entry in the server storage mapping table 12401, acquires the host computer name, volume number in the host computer, storage subsystem name, destination port name, and correspondence of the logical volume number in the storage subsystem from the information collection programs in the host computer, and registers such information in each column of the newly created entry. The information collection program may acquire the host computer name, volume number in the host computer, destination storage subsystem name, destination data interface number, logical volume number of the destination storage subsystem, and RAID group correspondence of the destination storage subsystem by any method; for instance, by issuing a SCSI Inquiry from the host computer to the respective logical volumes and acquiring the foregoing information from the storage subsystem.

Subsequently, at the server storage mapping table and performance information table creation step 1002 to be executed by the performance correlation management program 12100, the processor 11000 creates a new entry in the performance information table 12501, acquires performance information from the information collection program of the host computer and the information collection program of the storage subsystem, and registers such information in each column of the newly created entry. The processor 11000 may acquire the performance information based on the host computer information collection program by any method; for instance, by requesting the OS to acquire such information. The information collection program of the storage may acquire the performance information by any method; for example, by acquiring such information from a memory accumulated with performance information. In this embodiment, as one example, the IO response time, the read IO response time, and the write IO response time per second for each logical volume are acquired.

At copy configuration information table creation step 1004 to be executed as a result of reading the copy configuration management program 12700, a new entry is created in the copy configuration information table 12411, and the storage name of the storage subsystem comprising the logical volumes set with copy configuration information, logical volume number of the logical volumes set with copy configuration information, PS information showing whether it is a replication source logical volume or a replication destination logical volume, storage name of the storage subsystem comprising the opponent's logical volumes of copy configuration information, and logical volume number of the opponent's logical volumes of copy configuration information are acquired from the information collection programs of the storage subsystem, and registered in each column of the newly created entry.

At configuration information table creation step 1005 to be executed by the processor 11000 reading the performance correlation management program, the processor 11000 creates a new entry in the configuration information table 12421, creates and entry of a server storage mapping table from the configuration information repository, and sets the value of each column in the new entry. Subsequently, the processor 11000 searches for an entry retaining the storage name and logical volume coinciding with the storage name and logical volume number set in the new entry from the copy configuration information table of the configuration information repository. When there are coinciding storage name and logical volume in the copy configuration information table, the copy opponent storage name and the value of the copy opponent logical volume number column are registered in the copy opponent storage name column and the copy opponent logical volume number column of the new entry.

At copy status table creation step 1007 to be executed by the copy configuration management program, the processor 11000 creates a new entry in the copy status table, acquires information from the copy configuration information table, and registers the acquired information in each entry of the copy status table. Further, [the processor 11000] acquires the copy configuration status from the information collection program of the host computer, and sets it in the copy configuration status column of the new entry. In this embodiment, although the copy configuration status was acquired from the information collection program of the host computer, the copy status may also be acquired from the information collection program of the storage subsystem, or from a program for acquiring the copy configuration status of a separate host computer.

Figure 12:
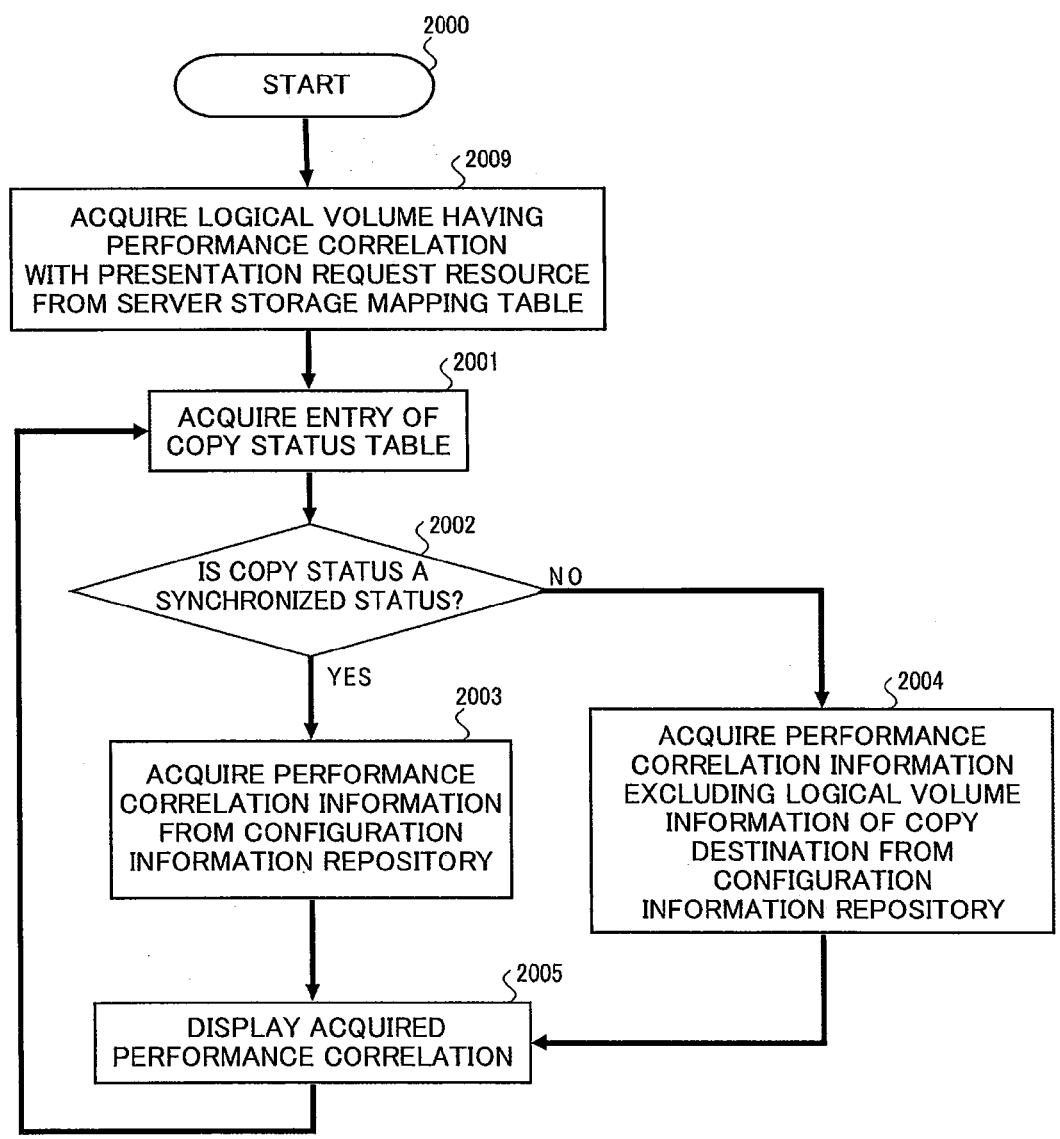
FIG. 12 is a flowchart showing an example of performance correlation management processing and performance correlation presentation processing of the performance correlation management program according to an embodiment of the present invention.

FIG. 12 shows a flowchart illustrating the outline of performance correlation management processing and performance correlation presentation processing to be executed by the processor 11000 reading the performance correlation management program 12100. The performance correlation management processing and performance correlation presentation processing to be performed by the performance correlation management program 12100 in the performance monitoring computer 10000 are now explained. Unless otherwise specified herein, each step shall be performed by the processor 11000.

The processor 11000 receives an operational status presentation request from the terminal of the SAN administrator via the input module 15000 and from the host system management software. The processor 11000 acquires information on logical volumes from the logical volume column in the entry from the resource requested for presentation; for instance, from the server storage mapping table with the logical volume number as the key (step 2009). Subsequently, the processor 11000 acquires information on the copy status table created at step 1007 of the volume number related table creation processing 1000 with the logical volume number of the acquired logical volume and the storage name of the storage comprising the logical volumes (step 2001).

The processor 11000 thereafter refers to the value of the copy configuration status column of the copy status table, and determines whether the copy configuration status is a synchronized status (step 2002). The processor 1000, based on the determination result at step 2002, decides whether to acquire the configuration information of logical volumes of the copy destination. When the status of copy configuration is a synchronized status, the processor 11000 acquires performance correlation information from the configuration information table of the configuration information repository (step 2003). Meanwhile, when the status of copy configuration is other than a synchronized status, the processor 11000 acquires performance correlation information from the server storage mapping table of the configuration information repository (step 2004).

The processor 11000 outputs the performance correlation information acquired from the configuration information repository at step 2003 or step 2004 to the output module 14000 (step 2005).

Further, [the processor 11000] monitors the copy status, specifies the performance correlation, and changes the presentation information based on the performance correlation. For example, when the status is no longer a synchronized status, the [processor 11000 outputs the performance correlation information] to the output module 14000 without including the performance information of logical volumes of the copy destination.

In this embodiment, the change in the copy status in logical volume units is used as the timing for switching the presentation. Further, the change in the copy status in group units of the copy configuration for each business affair, the change in the copy status in group units of the logical volumes being used by an arbitrary host computer, or the change in the copy status in group units of the copy configuration coinciding with <host computer using the logical volumes of the copy source, copy source storage, copy destination storage> may also be used as the timing for switching the presentation.

Further, an arbitrary time interval may also be used as the timing for switching the presentation. In this embodiment, although the cases were separated by whether the copy configuration status is a synchronized status or another status, different performance correlation may also be output according to other copy statuses.

This processing may also be periodically executed by the processor 11000 of the performance monitoring computer 10000 executing the program stored in the memory 12000. The output performance correlation is notified to the SAN administrator or the host system management software, and is used for pursuing the cause of performance deterioration in the SAN.

Figure 13:
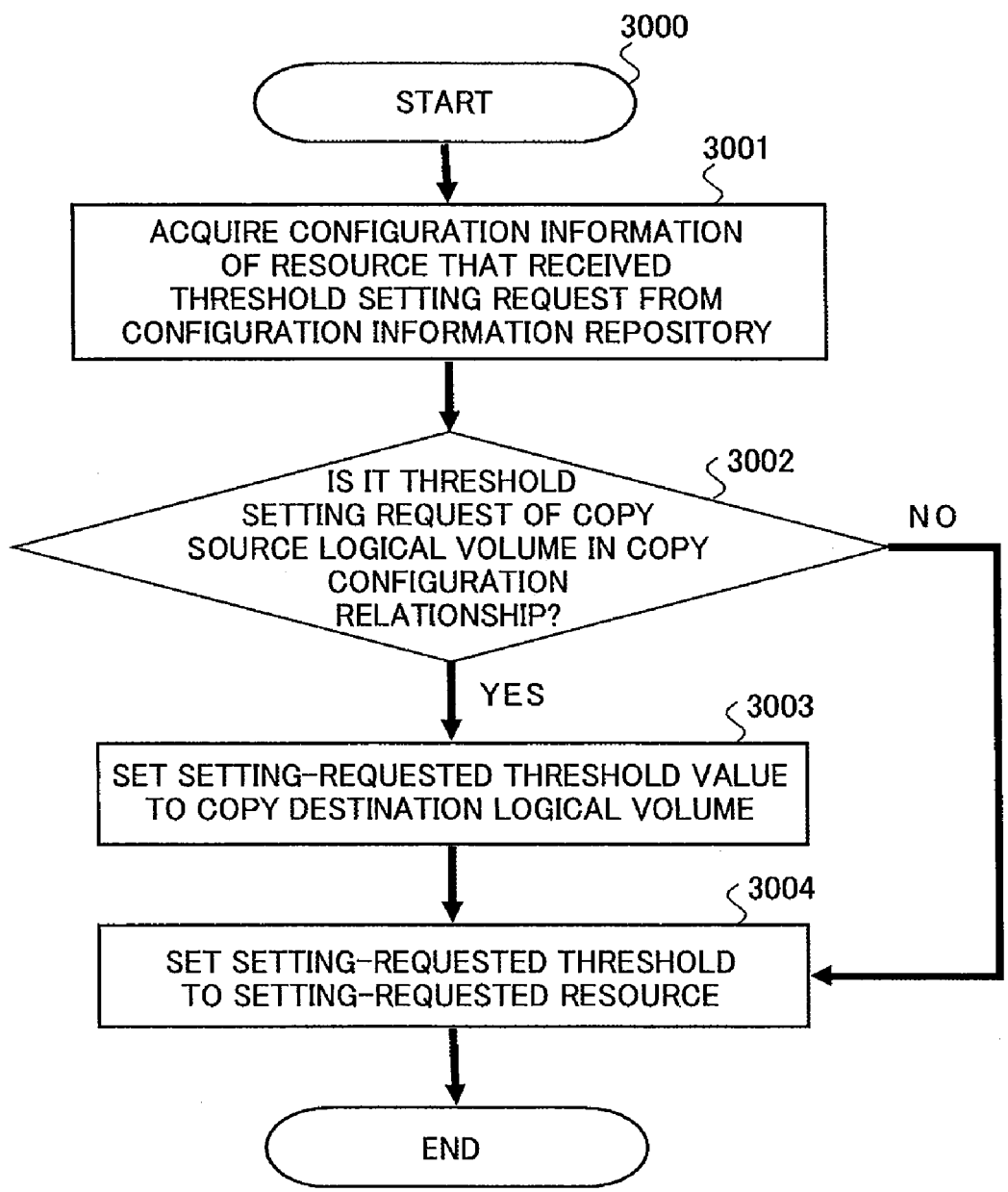
FIG. 13 is a flowchart showing an example of threshold value setting processing of performance monitoring according to a copy status of the threshold value management program according to an embodiment of the present invention.

FIG. 13 shows a flowchart 3000 illustrating the outline of threshold value setting processing according to the copy configuration status to be performed as a result of the processor 11000 reading the threshold value management program 12200 from the memory 12000 and executing the same. This processing is performed by the processor 11000 of the performance monitoring computer 10000 reading and executing the program stored in the memory 12000, and setting the threshold value according to the copy configuration status. Unless otherwise specified herein, each step shall be performed by the processor 11000.

The processor 11000 receives a threshold value setting request input by the SAN administrator via the input module and acquires the copy configuration information of the requested resource from the copy configuration information table of the configuration information repository (step 3001). The processor 11000 checks whether the requested resource is a threshold value setting request to the copy source logical volume having a copy configuration relationship from the acquired configuration information (step 3002). Subsequently, when the [requested resource] is a threshold value setting request to the copy source logical volume having a copy configuration relationship, [the processor 11000] sets the threshold value in the copy destination logical volume (step 3003). Finally, [the processor 11000] sets this threshold value to the resource to which the setting of the threshold value was requested (step 3004).

In this embodiment, since "synchronized" and "suspended" are used as examples of the copy configuration status, the same threshold value is set to the copy source logical volumes and the copy destination logical volumes as the threshold value for "synchronized," and the threshold value for "suspended" is not set to the copy destination logical volumes. Incidentally, when giving consideration to other statuses such as "create" as the copy configuration status, a threshold value may be set according to the respective copy statuses for monitoring. Further, in this embodiment, regardless of the result at step 3002, the threshold value requested for setting at step 3004 is set as is to the requested resource, for example, the threshold value of the copy source logical volume defined with the copy configuration relationship and the threshold value of the copy destination logical volume may also be set upon adding changes that give consideration to the amount of deterioration in the performance caused by the copy from the threshold value requested to be set.

Figure 14:
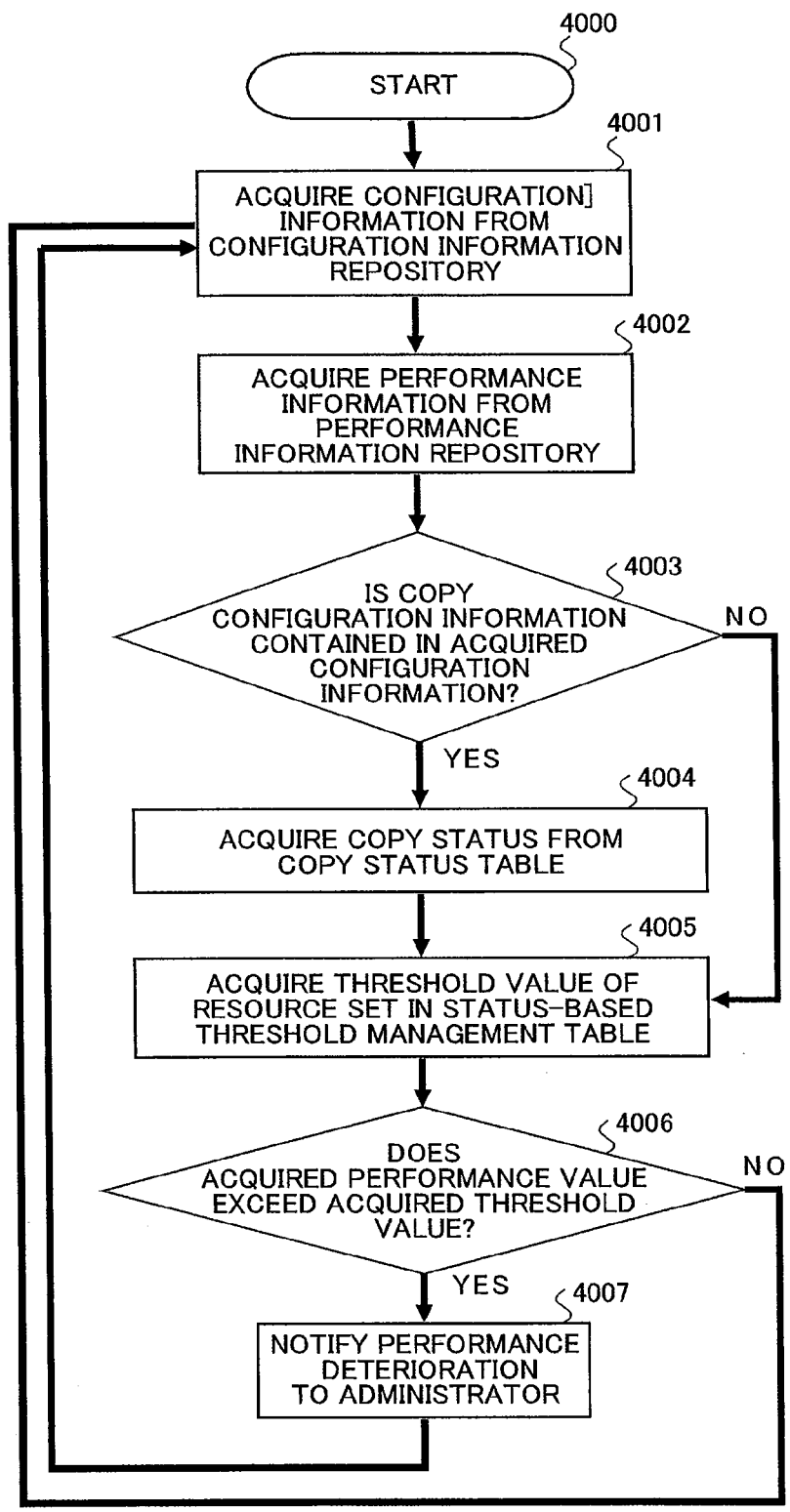
FIG. 14 is a flowchart showing an example of alert notice processing resulting from making changes to the performance monitoring target of the threshold value management program and the threshold value of performance monitoring according to an embodiment of the present invention.

FIG. 14 shows a flowchart 4000 illustrating the outline of alert notice processing resulting from making changes to the performance monitoring target and the threshold value of performance monitoring to be performed by the processor 11000 executing the threshold value management program 12200 stored in the memory 12000. Unless otherwise specified herein, each step shall be performed by the processor 11000.

The processor 11000 acquires configuration information from the configuration information table (step 4001). Subsequently, the processor 11000 acquires performance information from the performance information repository (step 4002). The processor 11000 determines whether the acquired configuration information contains copy configuration information (step 4003). When copy configuration information is contained in the acquired configuration information, the processor 11000 acquires the copy configuration status from the copy status table (step 4004). Subsequently, the processor 11000 acquires the threshold values of separate resources respectively set to the status-based threshold value management table 12600 according to the existence of copy configuration information and the acquired copy configuration status (step 4005). Finally, the processor 11000 determines whether the [acquired configuration information] exceeds the threshold value (step 4006), and decides whether to notify the administrator (step 4007). For example, the processor 11000 notifies the administrator's terminal, or displays an alert on the display screen operated by the administrator.

This processing is performed by the processor 11000 of the performance monitoring computer 10000 executing the program stored in the memory 12000, and is performed for issuing an alert notice upon changing the performance monitoring target and the threshold value of performance monitoring based on the latest performance correlation including the copy configuration status in the SAN environment during performance deterioration. The performance monitoring computer notifies the alert to the SAN administrator's terminal or the host system management software, and is used for pursuing the performance deterioration in the SAN.

Figure 15:
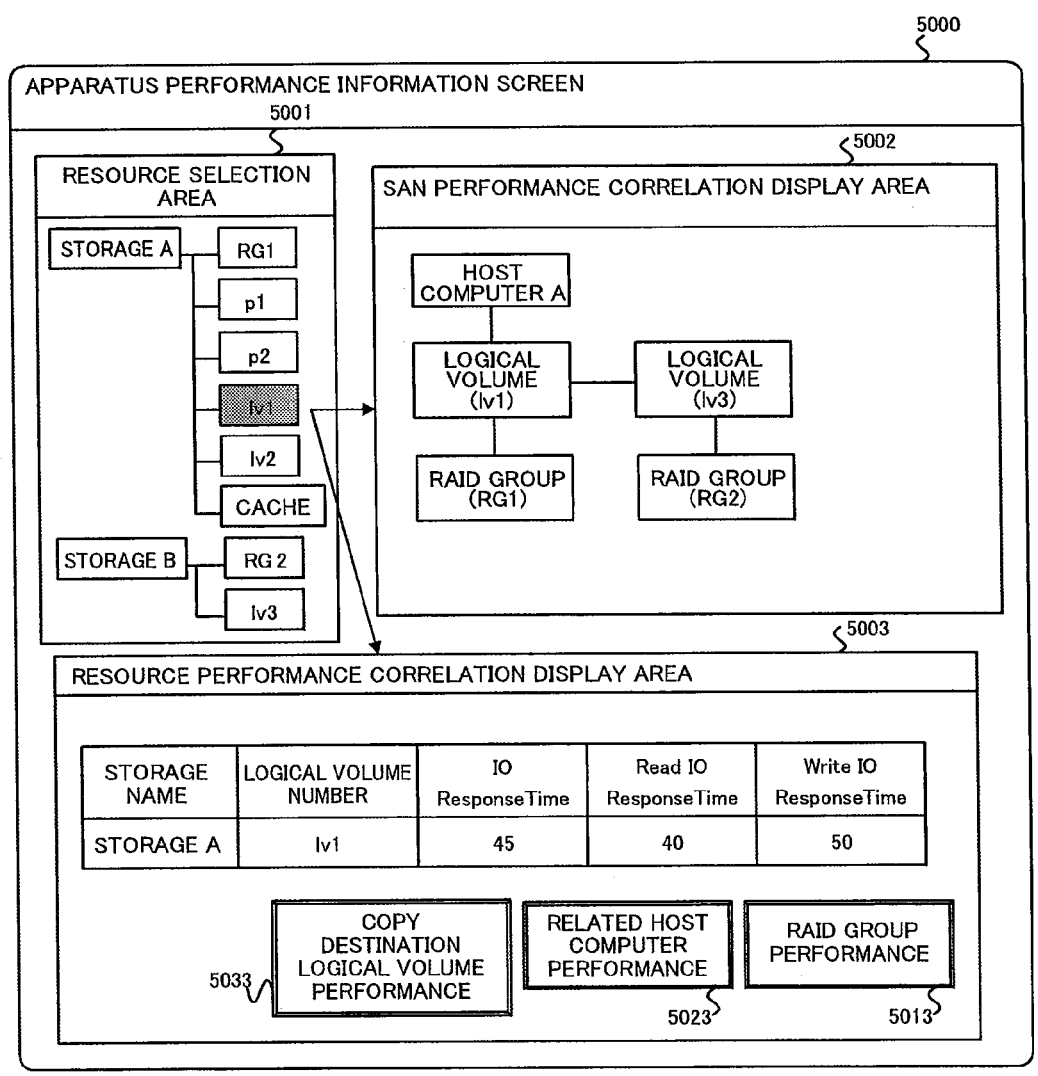
FIG. 15 is a diagram showing an example of an apparatus performance information screen to be presented to an administrator according to an embodiment of the present invention.

FIG. 15 shows an apparatus performance information screen 5000 output by the processor at step 2005. The screen 5000 of FIG. 15 displays a resource selection area 5001, a SAN performance correlation display area 5002, and a resource performance information display area 5003. The resource selection area 5001 illustrates the storage subsystem and the resources of the storage subsystem in a tree structure having a plurality of symbols. Specifically, this tree structure represents, for each storage subsystem, the storages A and B, which are storage subsystems, as parent nodes, or parent symbols, and the RAID group, port, logical volume, and cache, which are resources of each storage subsystem, as child nodes, or child symbols. The resources of the storage A and the resources of the storage B are respectively shown as tree structures. Further, the resource selection area 5001 of FIG. 15 shows that the logical volume lv1, which is one child node, or child symbol, shown in the tree structure, has been selected through designation with the input module 15000.

The SAN performance correlation display area 5002 is an area for displaying information relating to the resources selected in the resource selection area 5001 based on the performance correlation specified with the created performance correlation information by the processor 11000 executing the performance correlation management program 12100.

Specifically, the host computer A for mounting the logical volume lv1 and the RAID group RG1 as the physical storage area of the logical volume lv1 are connected with a solid line in the SAN performance correlation display area 5002. Further, the logical volume lv1 is connected to the logical volume lv3 with a solid line in a copy configuration relationship due to step 2009, and the logical volume lv1 and the logical volume lv3 are connected with a solid line since the status of copy configuration is a synchronized status due to step 2002 and step 2003, and these solid lines represent performance correlation.

The resource performance information display area 5003 is an area for displaying the performance information of resources selected in the resource selection area 5001. The resource performance information display area 5003 of FIG. 15 displays performance information from the table 12501 showing the SAN performance information in the performance information repository extracted among the performance information acquired at step 2003 with the selected resource as the key. The RAID group performance button 5013, related host computer performance button 5023, and copy destination logical volume performance button 5033 in the resource performance information display area 5003 are icons for issuing commands to output the performance information determined and specified at step 2002 to 2004. When the input module 15000 selects an icon, the processor 11000 displays on the output module 14000 performance information of the resource having performance correlation with the resource selected in the resource selection area 5001.

The [processor 11000] further displays the logical volume lv3 in a copy configuration relationship with the logical volume lv1 and of a synchronized status, and the RAID group RG2 as the physical storage area of the logical volume lv3.

Figure 16:
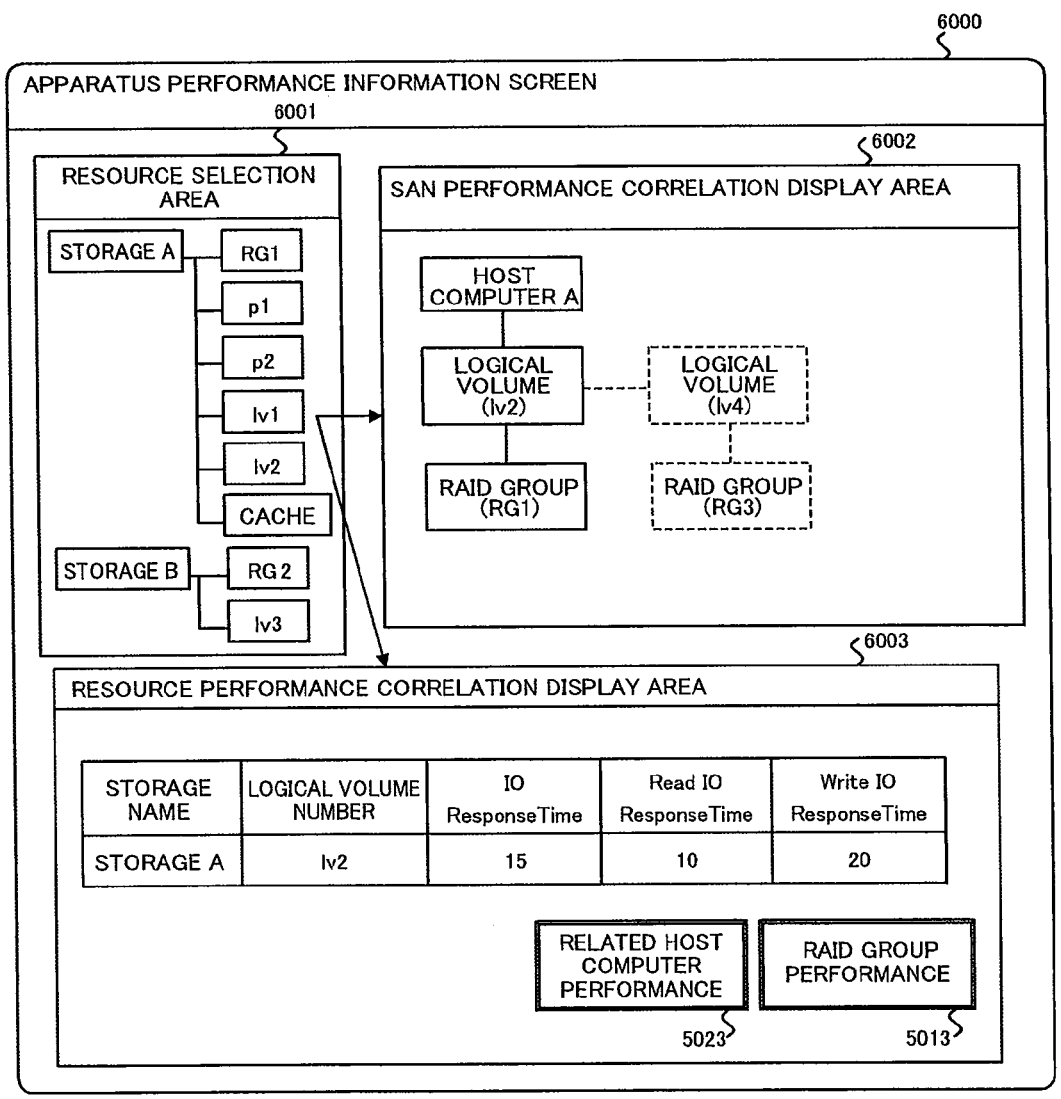
FIG. 16 is a diagram showing an example of a performance information screen according to an embodiment of the present invention.

FIG. 16 shows an apparatus performance information screen 6000 output by the processor at step 2005. The apparatus performance information screen 6000 of FIG. 16 has the same display area configuration as FIG. 15, and is a screen containing a resource selection area 6001, a SAN performance correlation display area 6002, and a resource performance information display area 6003. The resource selection area 6001 of FIG. 16 shows that the logical volume lv2, which is one of the tree child nodes, or child symbols, has been selected.

The SAN performance correlation display area 6002 is displaying resources correlated with the logical volume lv2 selected in the resource selection area 6001. Since the logical volume lv2 is correlated with the host computer A and the RAID group (RG1), the host computer A for mounting the logical volume lv2 and the RAID group RG1 as the physical storage area of the logical volume lv2 are displayed and connected with a solid line. The reason the logical volume lv2 is correlated to the host computer A and the RAID group (RG1) is because the RAID group (RG1) corresponding to the logical volume lv2 is accessed according to the access made from the host computer A to the logical volume lv2. Meanwhile, the logical volume lv4 and the RAID group (RG3) are displays as a grayout, the logical volume lv2 and the logical volume lv4 are connected with a dotted line, and the logical volume 4 and the RAID group (RG3) are connected with a dotted line and displayed. The logical volume lv2 is to be selected by the copy configuration table acquired at step 2001 and is connected to the logical volume lv4 with a line due to the copy configuration relationship of these volumes, and this example shows the correspondence between resources configured across storage subsystems. Meanwhile, since the copy configuration status is a suspended status, the volumes are connected with a dotted line, and the logical volume lv4 and the RAID group as the physical storage area of the logical volume lv4 are displayed in a grayout, and this example shows that there is no performance correlation. Incidentally, in order to show that there is no performance correlation, for instance, a method of not displaying the resource without any performance correlation, or a method of displaying, in separate colors, the resource with performance correlation when the pair status is a synchronized status, and the resource without any correlation when the pair status is a suspended status may be adopted.

The resource performance information display area 6003 displays the performance information of the logical volume lv2 to be selected, and an icon 6023 for outputting the related host computer performance as a resource with performance correlation and an icon 6013 for outputting the performance of the RAID group as a resource with performance correlation are displayed by the processor 11000 on the output module 14000. An icon for outputting the performance of a logical volume in a copy configuration relationship as shown in FIG. 15, without performance correlation, is not displayed.

As a modified example of the first embodiment, a case of specifying the performance correlation according to the copy configuration status in the case of asynchronous copy configuration definition is explained.

Asynchronous copy configuration is a copy configuration in a relationship where the I/O from the host computer to the replication source logical volume set with the copy configuration information is stored together with the updated location in the storage subsystem comprising the replication source logical volume set with the copy configuration information, and the update data and changed location are subsequently and collectively sent to the replication destination logical volume. In the second embodiment, a case of differentiating synchronous copy and asynchronous copy is explained.

Figure 17:
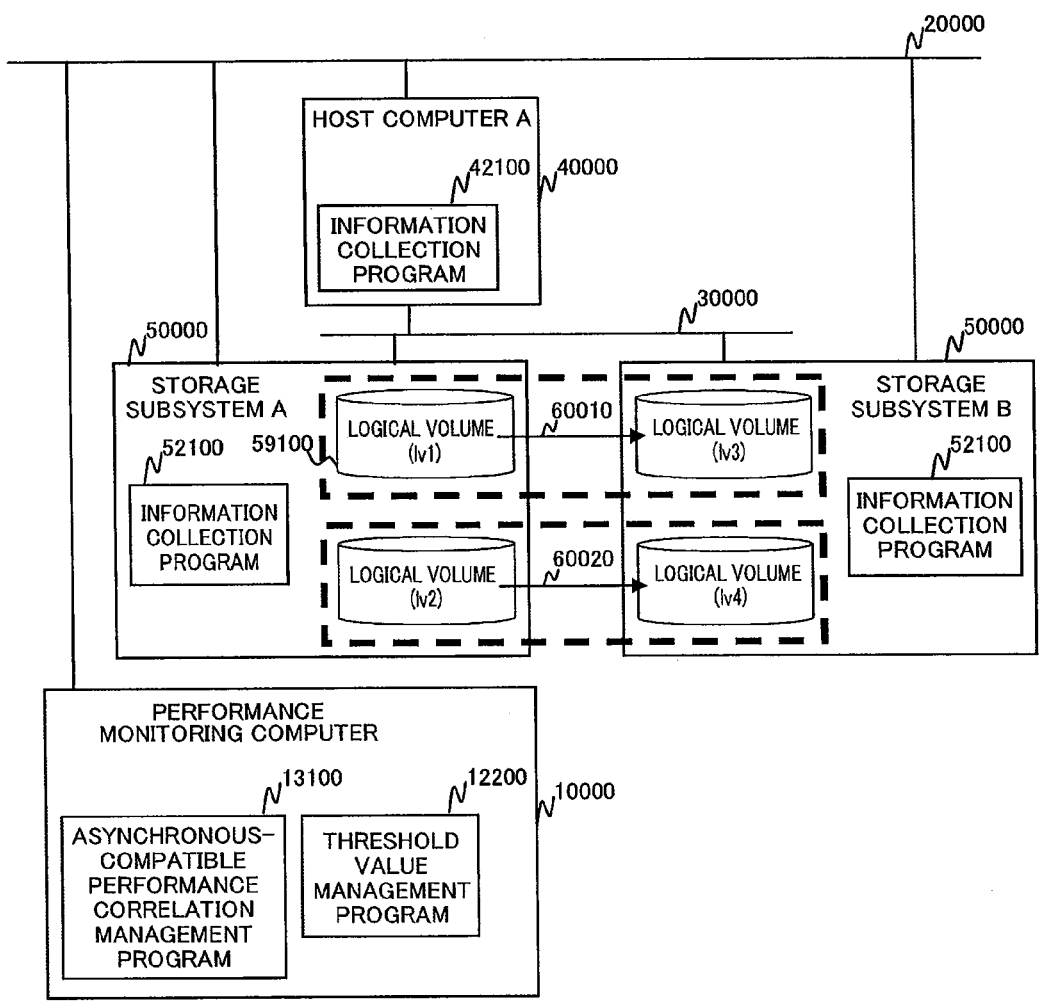
FIG. 17 is a diagram showing a configuration example of a computer system according to a modified example of the present invention.

FIG. 17 shows a configuration example of the computer system in a modified example. For the sake of convenience in the ensuing explanation, let it be assumed that, with the SAN of the present embodiment, one host computer (host computer A) 40000 and two storage subsystems (storage subsystem A, storage subsystem B) 50000 retaining a copy function are mutually connected via a fibre channel 30000. The logical volumes lv1, lv2 of the storage subsystem A are provided to the host computer A. Further, let it be assumed that synchronous copy configuration definition 60010 is performed between the logical volume lv1 of the storage subsystem A and the logical volume lv3 of the storage subsystem B, and asynchronous copy configuration definition 60020 is performed between the logical volume lv2 of the storage subsystem A and the logical volume lv4 of the storage subsystem B based on the copy function. In present embodiment, although the copy source volume and the copy destination volume are placed in separate storage subsystems, the copy source volume and the copy destination volume may also exist in the same storage subsystem. In this embodiment, let it be assumed that the logical volumes lv1 and lv3, and the logical volumes lv2 and lv4 are both of a synchronized status.

The write I/O from the host computer A to the logical volume lv1 is sent to the logical volume lv1 via the fibre channel 30000, and the write I/O becomes complete in the host computer A after waiting for the completion of the write I/O in the logical volume lv1. Further, the write I/O from the host computer A to the logical volume lv2 is sent to the logical volume lv2 via the fibre channel 30000, and the write I/O in the host computer A becomes complete after waiting for the completion of the write I/O in the logical volume lv2.

The asynchronous-compatible performance correlation management program 121000 performs performance correlation management processing, performance correlation presentation processing and the like according to the processing routines described later. The remaining configuration is the same as FIG. 1.

Figure 18:
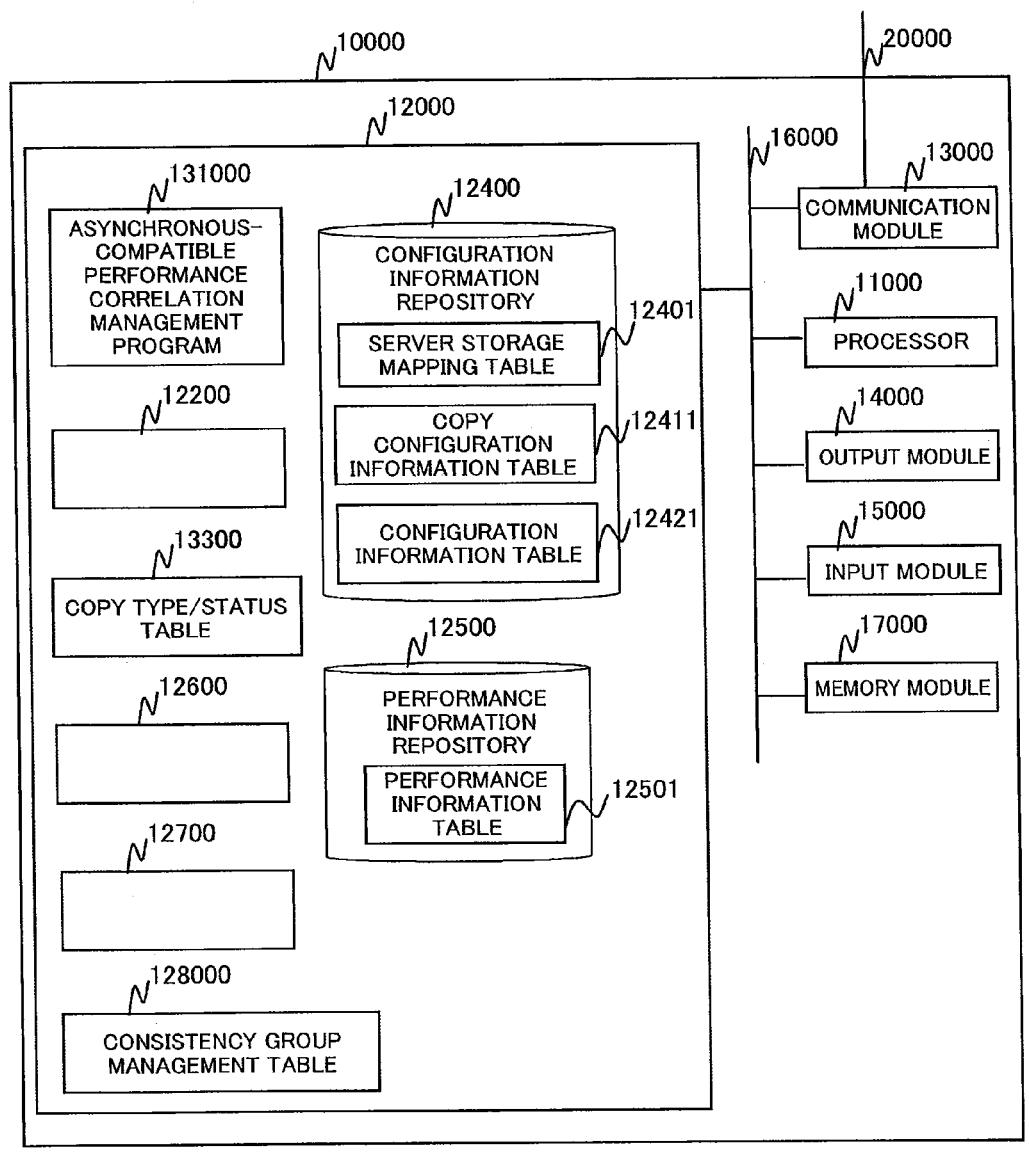
FIG. 18 is a diagram showing a configuration example of the performance monitoring computer according to a modified example of the present invention.

FIG. 18 shows a configuration example of the performance monitoring computer 10000. The memory 12000 of the performance monitoring computer 10000 stores programs to be executed by the performance monitoring computer including an asynchronous-compatible performance correlation program 131000, a copy configuration type/status table 133000, a consistency group management table 128000, and the like. The remaining constituent elements are the same as FIG. 2, and hereby omitted.

The configuration example of the host computer 40000 is the same as FIG. 3, and hereby omitted.

Figure 19:
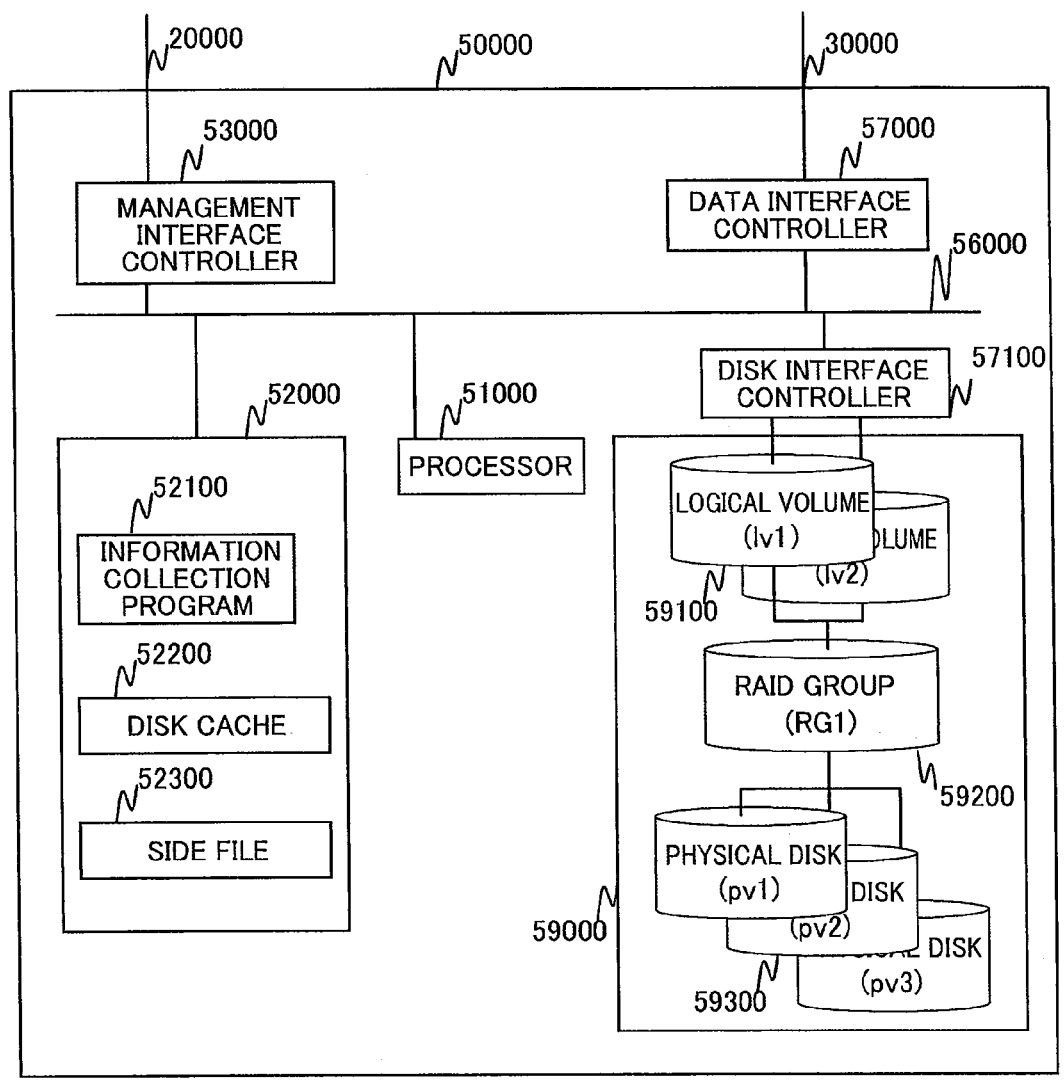
FIG. 19 is a diagram showing a configuration example of a storage subsystem according to a modified example of the present invention.

FIG. 19 shows a configuration example of the storage subsystem 50000. The memory 52000 of the storage subsystem 50000 contains a side file 52000 and the like. In the present embodiment, although the side file is configured independently in the memory, it may also be configured as a part of a disk cache, or configured separately from the memory 52000.

FIG. 20 is an example of a copy configuration type/status table 133000 retained by the performance monitoring computer 10000. This table stores the pair status of the replication source logical volume and the replication destination logical volume of each piece of copy configuration information.

The difference with FIG. 9 is as follows. The copy type of either synchronous copy or asynchronous copy is registered in the copy type column 123007, and whether the writing of a side file as an internal table to be used for guaranteeing the sequence of write data from the host computer during asynchronous remote copy has been performed is registered in the side file column 123008. Incidentally, entries with "-" registered in the side file column represent that a side file is not being used. A consistency group as a group guaranteed of the write sequence between the affiliated logical volumes in asynchronous copy is registered in the consistency group name column 123009. Incidentally, entries with "-" registered in the consistency group name column represent that they are not affiliated with a consistency group. The foregoing is the difference with the copy status table of FIG. 9.

FIG. 21 shows an example of a consistency group management table 128000 retained by the performance monitoring computer 10000. This table stores the correspondence of the consistency group and the logical volume. The consistency group management table 128000 is a table to which a record is added by the asynchronous-compatible performance correlation program 131000. A value for uniquely identifying the consistency groups is registered in the consistency group name column 128001 of the consistency group management table. A value for uniquely identifying the storage subsystems is registered in the storage name column 128002. A value for uniquely identifying the logical volumes is registered in the logical volume number column 128003.

Figure 22:
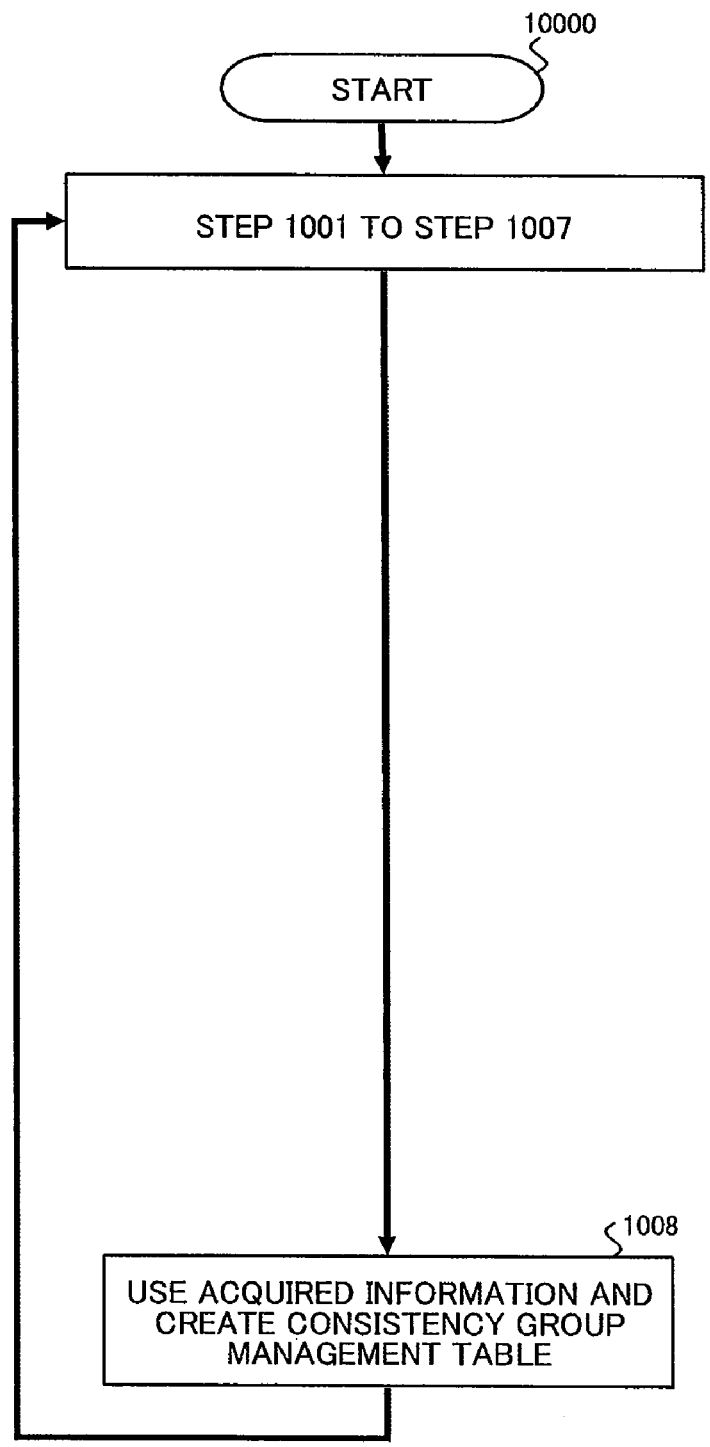
FIG. 22 is a flowchart showing an example of related table creation processing of a performance correlation management program according to a modified example of the present invention.

FIG. 22 shows a flowchart 10000 illustrating the outline of related table creation processing to be executed by the asynchronous-compatible performance correlation management program 12100. Step 1000 to step 1007 are the same as the first embodiment and hereby omitted. Finally, each piece of information acquired at step 1006 is used to create a consistency group management table (step 1008).

Figure 23:
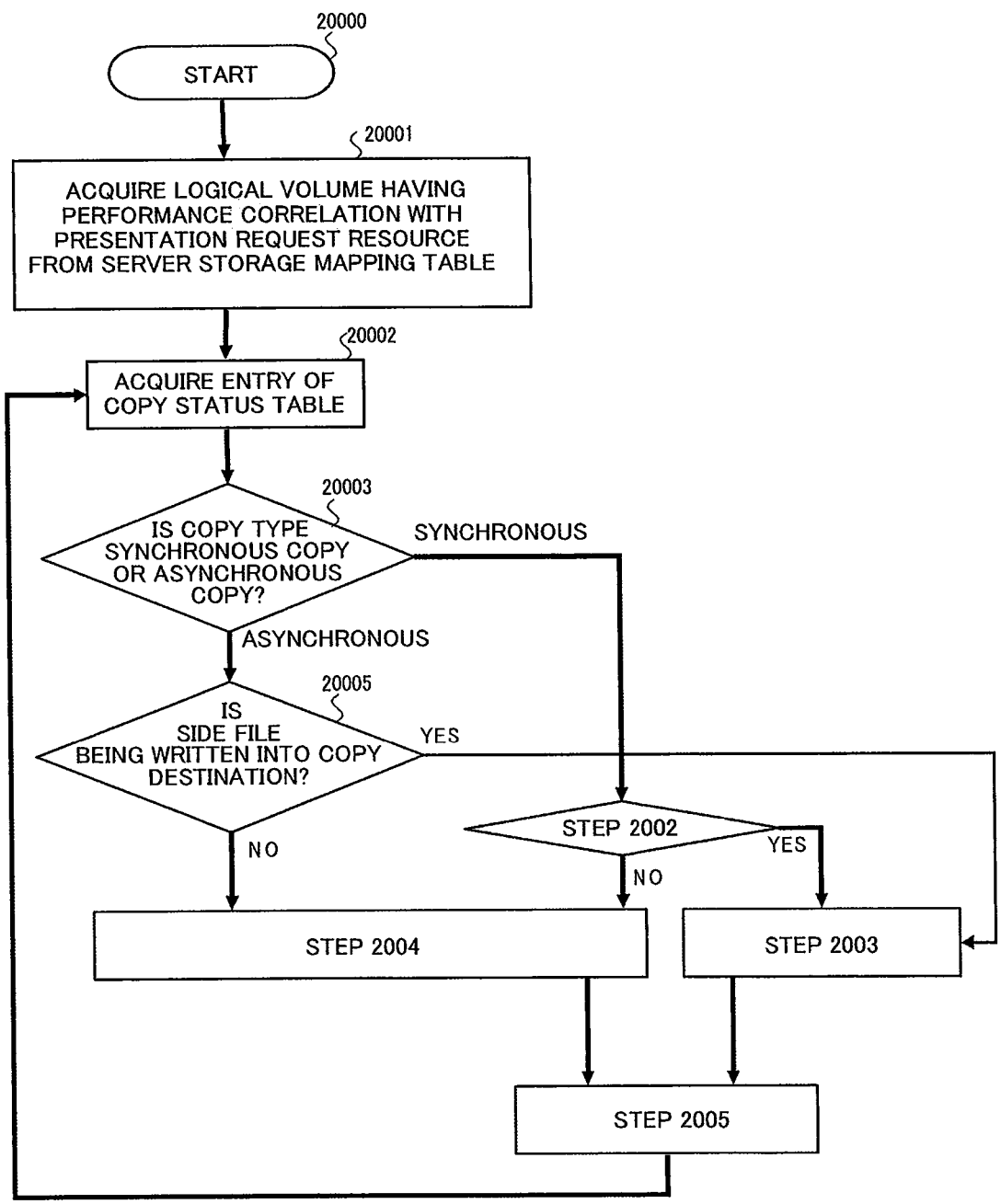
FIG. 23 is a flowchart showing an example of performance correlation management processing and performance correlation presentation processing of an asynchronous performance correlation management program according to a modified example of the present invention.

FIG. 23 shows a flowchart 20000 illustrating the outline of performance correlation management processing and performance correlation presentation processing to be executed by the asynchronous-compatible performance correlation management program 121000.

This processing is periodically executed by the processor 11000 of the performance monitoring computer 10000 executing the program stored in the memory 12000. The specified performance correlation is presented to the SAN administrator or the host system management software and used for pursuing the cause of performance deterioration in the SAN. Unless otherwise specified herein, each step shall be performed by the processor 11000.

Step 20001 and step 20002 are the same as FIG. 13.

Subsequently, the processor 11000 refers to the value of the copy type column of the copy configuration type/status table, and specifies the copy configuration type (step 20003). When the copy configuration type is synchronous copy, the processing routine proceeds to step 2002 of FIG. 13, and processing of step 2002 of FIG. 13 onward is performed. Meanwhile, when the copy configuration type is asynchronous copy, the processing routine proceeds to step 20005, and the processor 11000 refers to the value of the side file column of the copy configuration type/status table, and specifies whether the data retained in the side file is currently being written (step 20005). If the side file is currently being written, the processing routine proceeds to step 2003.

In this modified example, the change in the copy status in logical volume units is used as the timing for switching the output. Nevertheless, it is also possible to refer to the consistency group management table 128000 and, when the logical volumes affiliated with the same consistency group in logical volume units of the same consistency group show different copy configuration statuses, the copy configuration status shown by the most logical volumes may be set as the copy configuration status to be present to all logical volumes affiliated with the consistency group. In this modified example, although the cases were separated by whether the copy configuration status is a synchronized status or another status, different performance correlation may also be output according to other copy statuses.

Furthermore, in the threshold value setting processing according to the copy configuration status to be executed by the threshold value management program 12200, the processor 11000 may also refer to the consistency group management table 128000 and set the threshold value to the logical volumes contained in the same consistency group and all logical volumes of the copy destination of such logical volumes according to the flowchart 3000 shown in FIG. 13.

The method of display may be changed so as to differentiate the synchronous copy configuration type and the asynchronous copy configuration type in the resource performance information display area 5003. Further, when displaying the performance information of the replication source logical volume set with the asynchronous copy configuration type, the usage status of the side file may also be displayed. A side file is a table for properly maintaining the update order in the consistency group, and the increase of the side files and reference to the performance information of the copy destination logical volume will become indexes for determining whether the performance deterioration is being caused by the influence of the storage comprising the copy source logical volume, or the influence of the network between the storage comprising the copy source logical volume and the storage comprising the copy destination logical volume, or the influence of the storage comprising the copy destination logical volume.

The first modified example of the first embodiment was described above.

Figure 24:
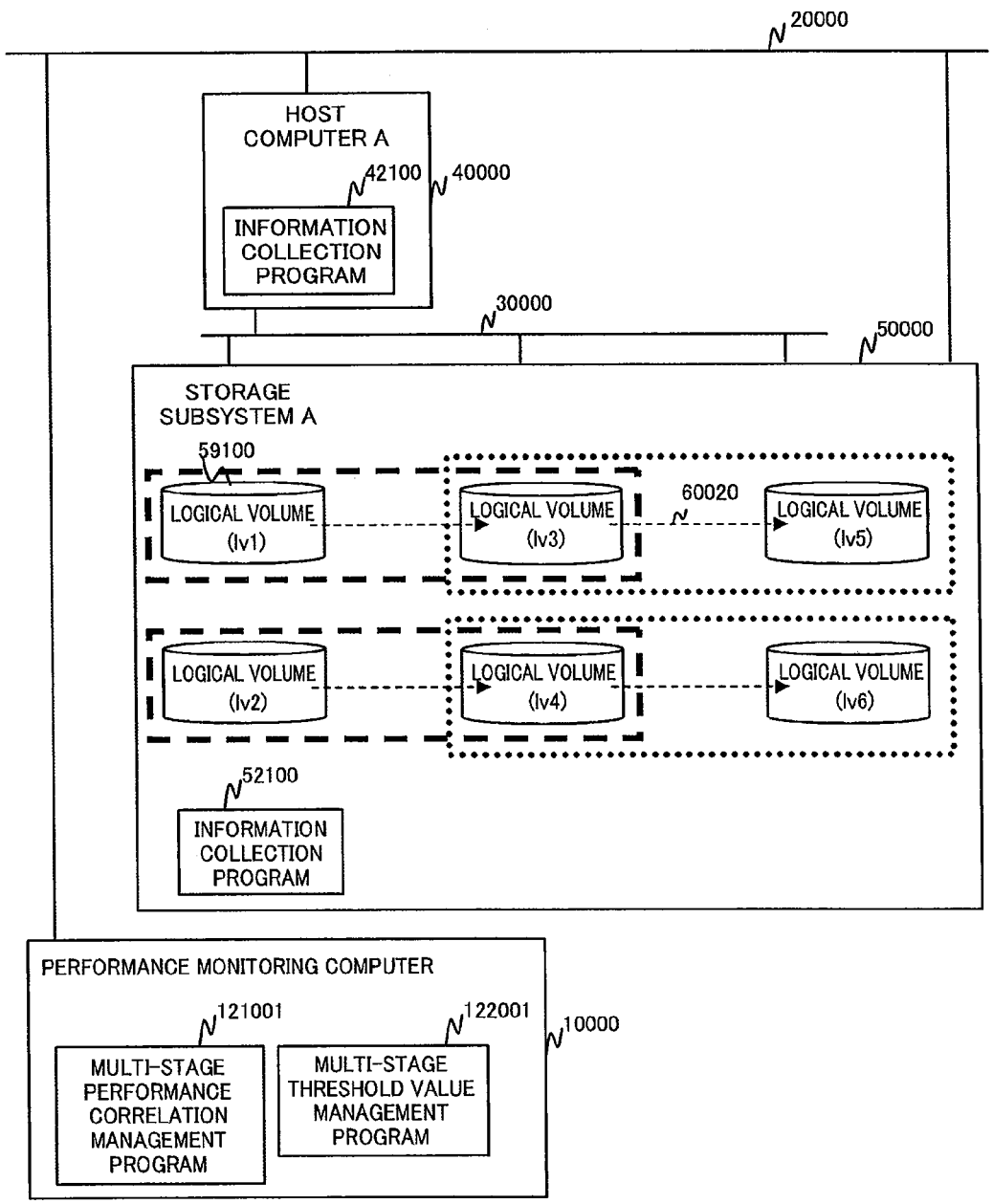
FIG. 24 is a diagram showing a configuration of a computer system according to another modified example of the present invention.

A second modified example of the first embodiment is now explained. FIG. 24 shows a configuration example of a computer system in the second modified example of the first embodiment. For the sake of convenience in the ensuing explanation, let it be assumed that, with the computer system of this modified example, one host computer (host computer A) 40000 and one storage subsystem (storage subsystem A) 50000 retaining a copy function are mutually connected via a fibre channel 30000. In this modified example, the logical volumes lv1, lv2 of the storage subsystem A are provided to the host computer A. Further, asynchronous copy configuration definition is being performed between the logical volume lv1 and the logical volume lv3 and between the logical volume lv2 and the logical volume lv4 of the storage subsystem A based on the copy function. Moreover, let it be assumed that asynchronous copy configuration definition 60010 is being performed between the logical volume lv3 and the logical volume lv5 and between the logical volume lv4 and the logical volume lv6 based on the copy function. The copy source volumes and the copy destination volumes may exist in the same storage subsystem as in this modified example, or the copy source volumes and the copy destination volumes may exist in separate storage subsystems. In this modified example, let it be assumed that the logical volumes lv1 and lv3, the logical volumes lv2 and lv4, and the logical volumes lv3 and lv5 are of a synchronized status, and the logical volumes lv4 and lv6 are of a suspended status.

In order to simplify this modified example, regardless of whether the copy type is synchronous or asynchronous, the explanation has been provided on the assumption that there is performance correlation between logical volumes in which the copy configuration information is a synchronized status, and that there is no performance correlation between logical volumes in which the copy configuration information is a suspended status. Nevertheless, this limitation does not limit the application of the present invention. In addition to the above, as an example of resources being correlated when there is a certain resource that influences the performance of a separate resource, there are logical volumes of the replication destination relating to the I/O response time to a prescribed volume of a certain host computer, and resources relating to the access response time in the physical storage device (for instance, RG or a disk apparatus configuring RG) configuring the logical volumes.

The performance monitoring computer 12000, as with FIG. 1, is connected to the host computer A, the storage subsystem A and the storage subsystem B, and communicates with the information collection program of each apparatus. The multi-stage performance correlation management program 121001 performs performance correlation management processing and performance correlation presentation processing based on the processing routines described later. The multi-stage threshold value management program 122001 performs threshold value setting processing of performance monitoring according to the copy status and alert notice processing resulting from making changes to the performance monitoring target and the threshold value of performance monitoring.

Figure 25:
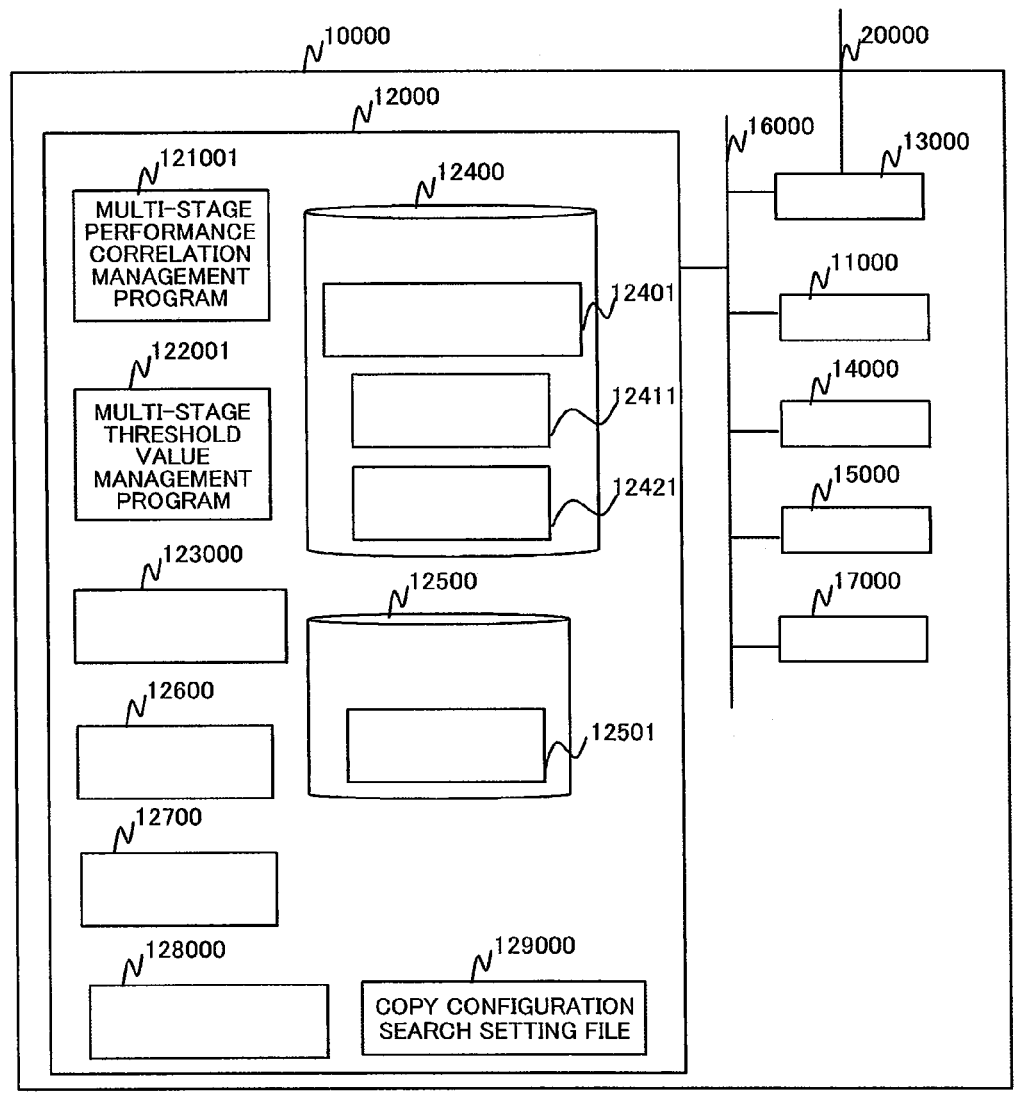
FIG. 25 is a diagram showing a configuration example of a performance monitoring computer according to another modified example of the present invention.

FIG. 25 shows a configuration example of the performance monitoring computer 10000. The memory 12000 of the performance monitoring computer 10001 contains programs to be executed by the performance monitoring computer such a multi-stage threshold value management program 122001, and a copy configuration search configuration file as a setting file showing the depth of copy configuration information limit in determining that there is performance correlation when the copy configuration status is a synchronized status. The copy configuration search configuration file can be set dynamically by the administrator inputting information from the input module using the apparatus information presentation screen 5000 shown in FIG. 28 and FIG. 29. The remaining constituent elements are the same as FIG. 2 and FIG. 18, and hereby omitted. In this modified example, let it be assumed that the value of the copy configuration search configuration file is set to 1.

The configuration example of the host computer 40000 and the storage subsystem 50000 is the same as FIG. 3, and hereby omitted.

Figure 26:
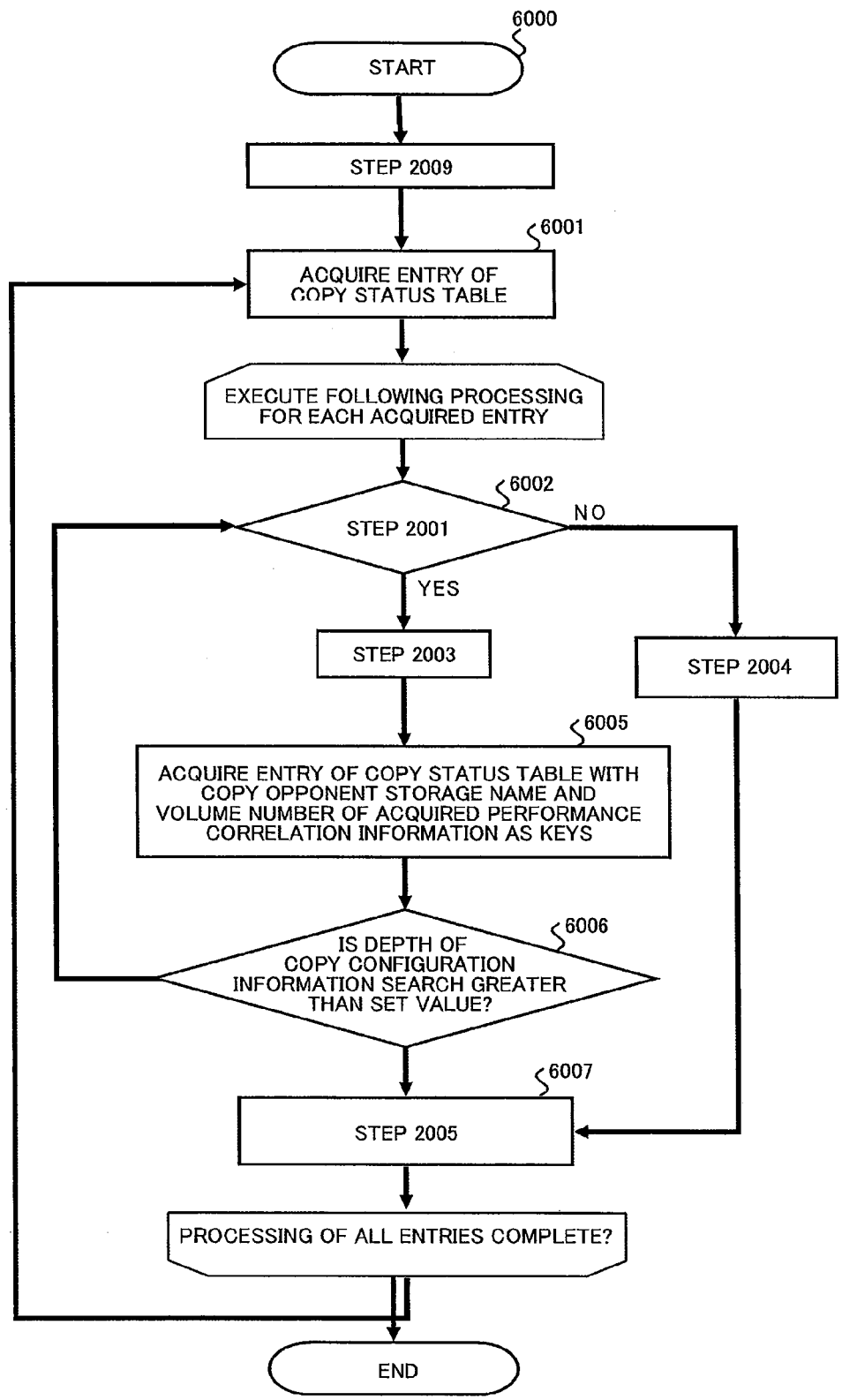
FIG. 26 is a flowchart showing an example of performance correlation management processing and performance correlation presentation processing of a multi-stage performance correlation management program according to another modified example of the present invention.

FIG. 26 shows a flowchart 6000 illustrating the performance correlation management processing and the performance correlation presentation processing of the second modified example to be performed by the processor 11000 executing the multi-stage performance correlation management program 121001. Based on the copy configuration type/status table 133000, the processor 11000 executes step 2009, step 2001, and step 2002. When the result is YES at step 2002, the processor 11000 executes step 2003. Subsequently, the processor 11000 acquires the entries of the copy configuration type/status table among the performance correlation information acquired at step 2003 with the copy opponent storage name and volume number of the configuration information of the copy destination logical volumes as the keys (step 6005). The processor 11000 thereafter refers to the set value, and determines whether the depth of the copy definition search is greater than the set value (step 6006). When the depth is less than the set value, the processing routine is repeated from step 2002.

Meanwhile, when the depth is greater than the set value, the processor 11000 ends the search of the copy configuration relationship, and executes step 2005. Step 2001 to step 2005 and step 2009 are the same as the processing of FIG. 12. The processor 11000 repeats the foregoing processing for each entry acquired at step 2009. When the repetition is complete, the processing routine returns to step 2001 once again, and the processor 11000 acquires the entries of the copy configuration type/status table, and repeats similar processing. When the result is NO at step 2002, the processor 11000 executes step 2004.

Incidentally, the set value is input via the input module before the flow of FIG. 26, and the correlation is subsequently displayed after the resource is selected. Incidentally, the input of the set value as the search value may also be performed after selecting the resource and displaying the correlation so as to update the display of correlation.

Figure 27:
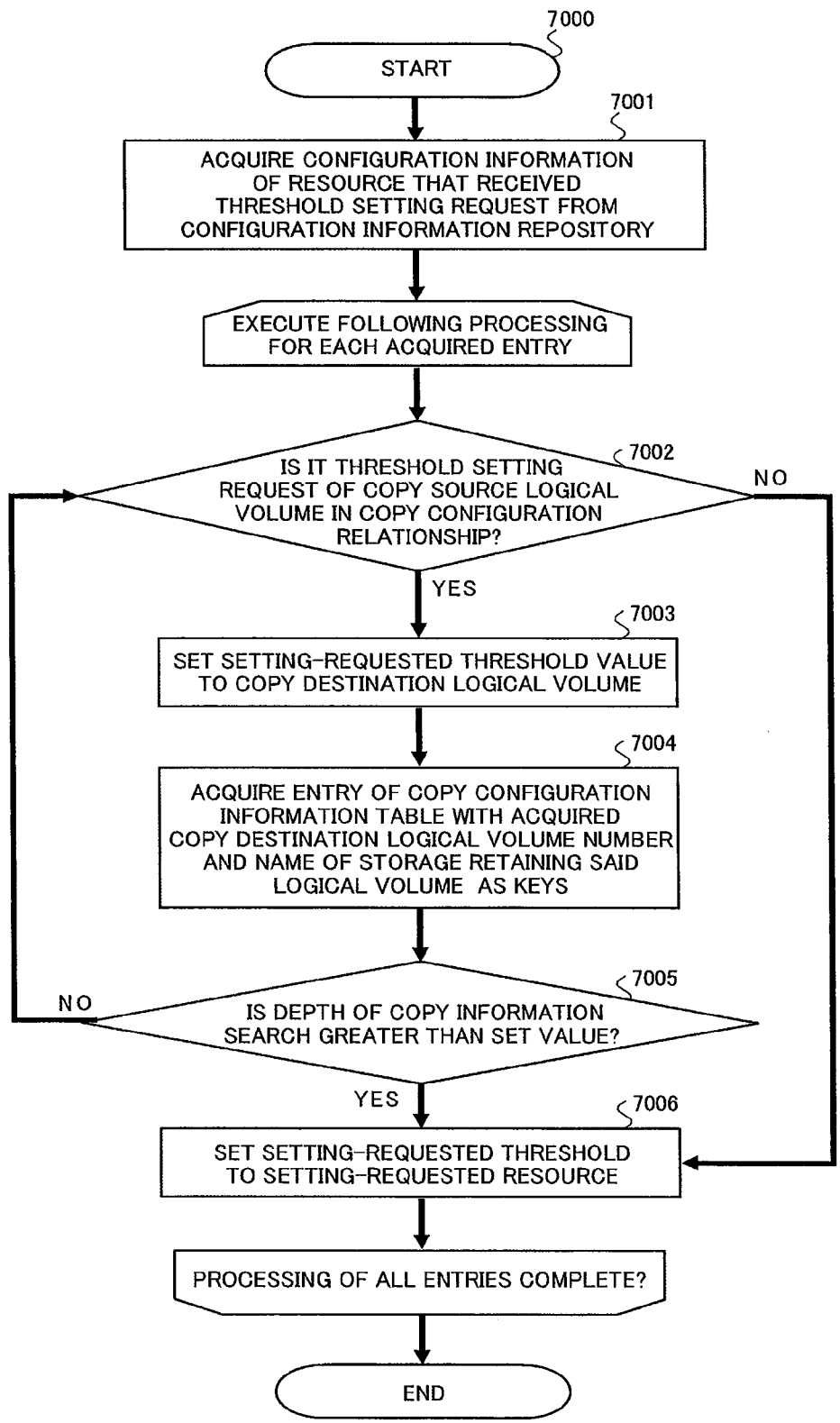
FIG. 27 is a flowchart showing an example of threshold value setting processing of performance monitoring according to a copy status of the multi-stage performance correlation management program according to another modified example of the present invention.

FIG. 27 shows a flowchart 7000 illustrating the threshold value setting processing of performance monitoring to be executed by the multi-stage threshold value management program 122001 in this second modified example.

The processor 11000 executes steps 3001, 3002, and checks whether the requested resource is a threshold value setting request to the copy source logical volume having a copy configuration relationship regarding each entry in the copy configuration information table acquired at step 3001 (step 3002).

The processor 11000 executes step 2003 when the requested resource is a threshold value setting request to the copy source logical volume having a copy configuration relationship. Subsequently, the processor 11000 acquires the entries of the copy configuration information table with the acquired copy destination logical volume number and the storage name retaining the logical volumes as the keys (step 7004). The processor 11000 determines whether the depth of the copy definition search is greater than a set value, and proceeds to step 3004 when the depth is greater than the set value (step 7005). Meanwhile, when the depth is less than the set value, the processor 11000 repeats the processing routine from step 7002. Further, even when the requested resource is not a threshold value setting request to the copy source logical volume having a copy configuration relationship at step 3002, a threshold value is set to the resource to which the setting was first requested. The foregoing processing is implemented for each entry, and the processing routine is thereby ended.

Figure 28:
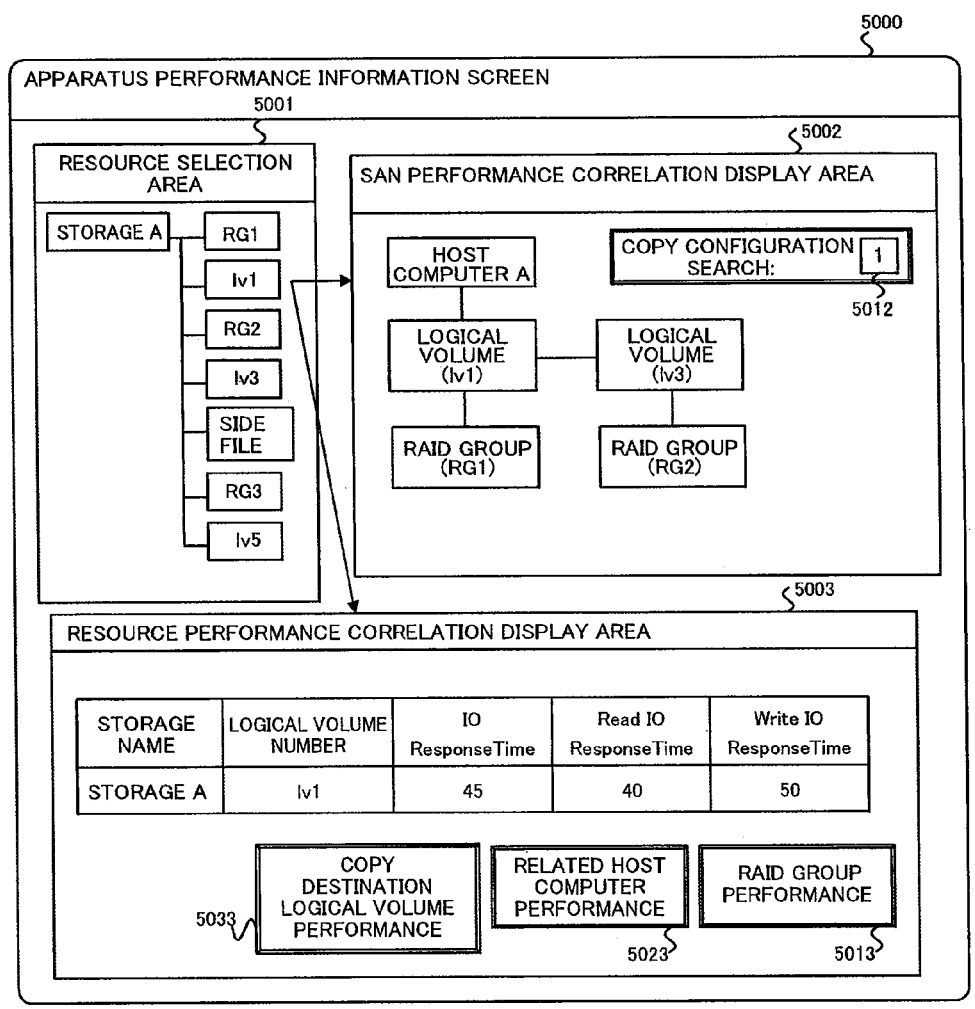
FIG. 28 is a diagram showing an example of a performance information screen according to another modified example of the present invention.

FIG. 28 is a diagram showing an example of the apparatus performance information screen 5000 output by the processor 11000 at step 2005 of the performance correlation management processing and performance correlation presentation processing flow 6000 of the performance correlation management program. In this modified example also, there are three display areas, and, in addition to FIG. 15, a SAN performance correlation display area 5002 and an input area 5012 of the copy configuration search configuration are provided.

In FIG. 28, a RAID group RG1 as the physical storage area of the logical volume lv1, a logical volume lv3 as the replication destination of the logical volume lv1 and in which the copy configuration status is a synchronized status, and a RAID group RG3 as a physical storage area of the logical volume lv3 are displayed. Here, a logical volume lv5 as the replication destination of the logical volume lv3 and in which the copy configuration status is a synchronized status is not presented to the SAN administrator since it is determined that there is no correlation based on the copy configuration search value set in the copy configuration search configuration file shown in 5012. In addition, the [logical volume] lv5 and the [RAID group] RG5 may also be presented in a manner to be differentiated from cases of other synchronized statuses via a grayout or the like.

Figure 29:
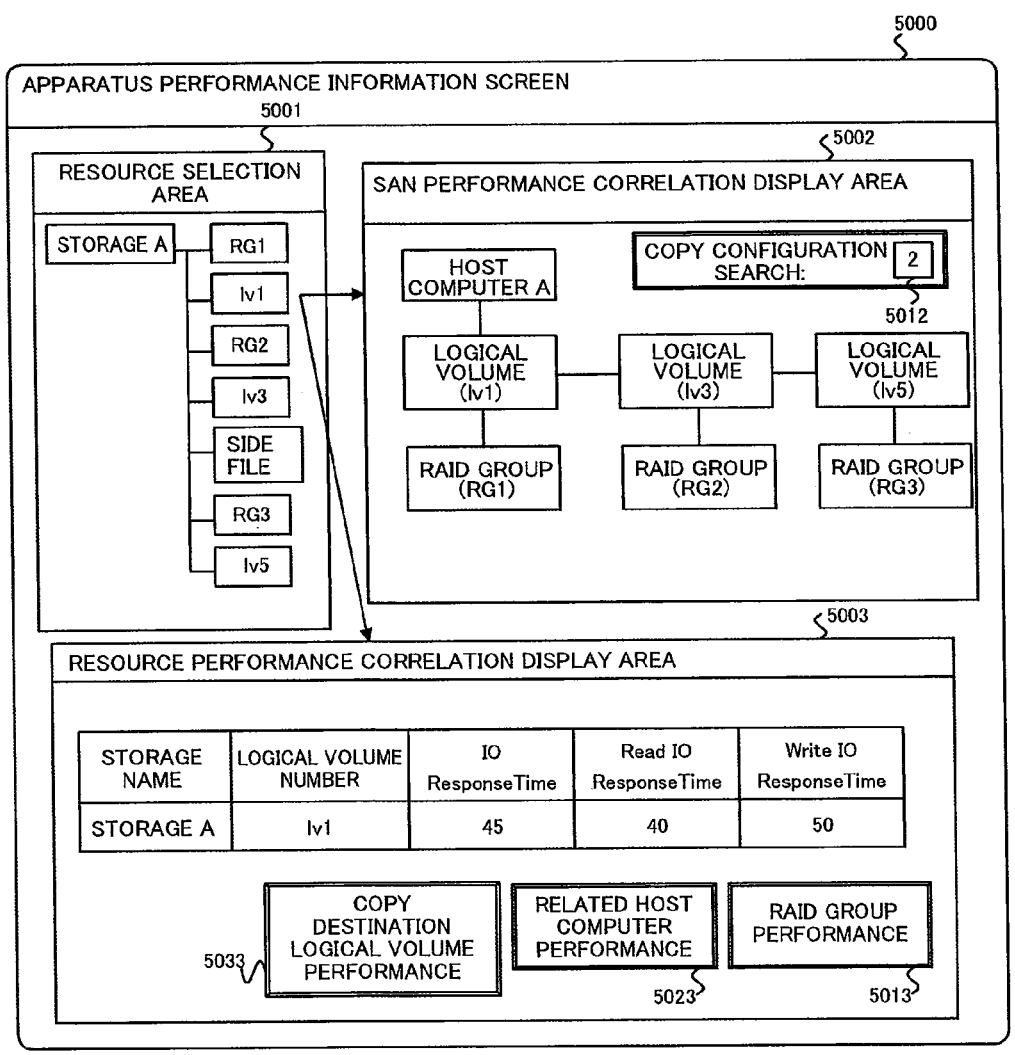
FIG. 29 is a diagram showing an example the performance information screen according to another modified example of the present invention.

In FIG. 28, as a result of the SAN administrator inputting "2" as the copy configuration search value, as shown in FIG. 29, the logical volume lv5 as the replication destination of the logical volume lv3 and in which the copy configuration status is a synchronized status will also be displayed. In the present embodiment, although the copy configuration search value is input by the SAN administrator, for example, it may also be set by other methods such as through static storage.

Figure 30:
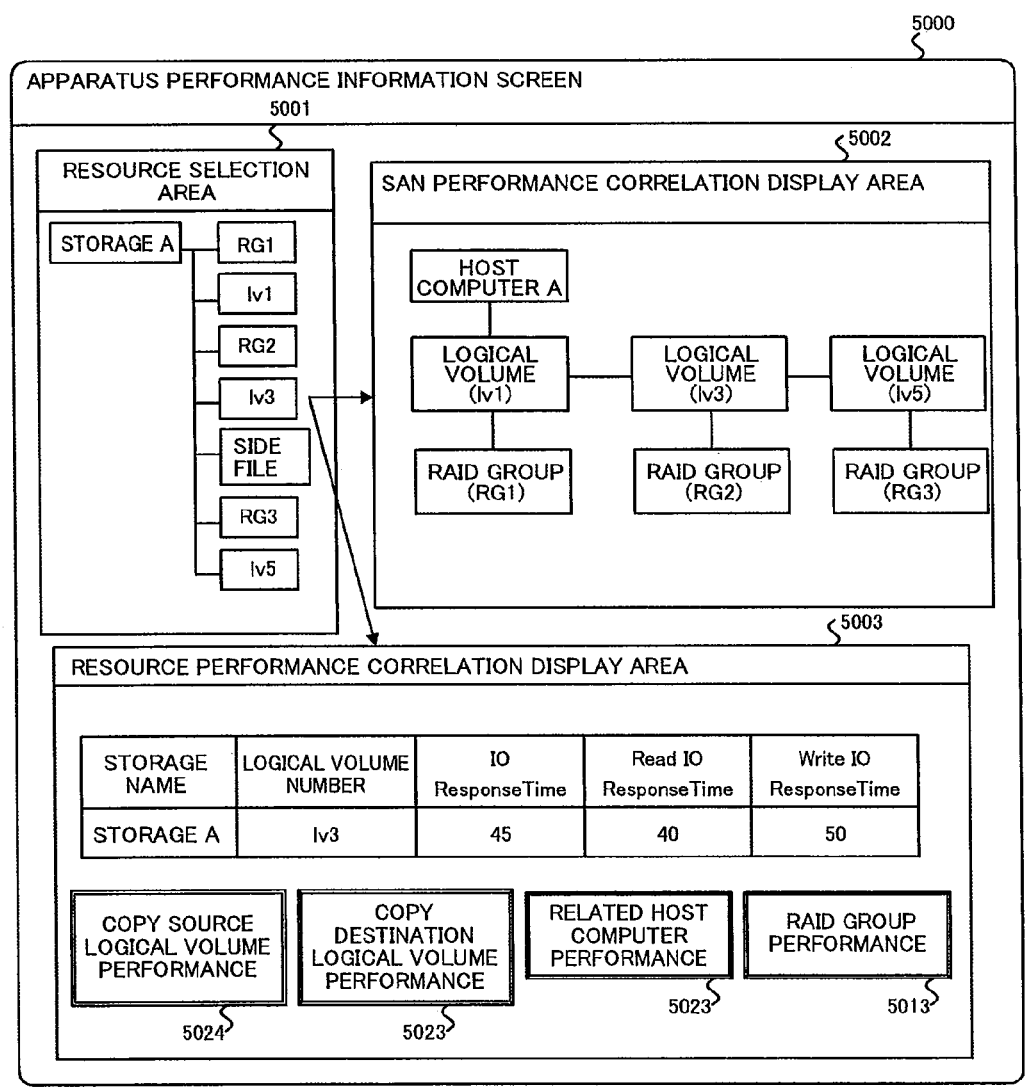
FIG. 30 is a diagram showing an example the performance information screen according to another modified example of the present invention.

In FIG. 30, a RAID group RG2 as the physical storage area of the logical volume lv3, a logical volume lv1 as the replication source of the logical volume lv3 and in which the copy configuration status is a synchronized status, a RAID group RG1 as the physical storage area of the logical volume lv1, a logical volume lv5 as the copy destination of the logical volume lv3 and in which the copy configuration status is a synchronized status, and a RAID group RG3 as the physical storage area of the logical volume lv5 are displayed.

The update of presentation is implemented according to the performance correlation presentation processing flow 6000 of the multi-stage performance correlation management program. In FIG. 30, performance information of the resource selected in the resource selection area 5001 is displayed in the resource performance information display area 5003. The RAID group performance button 5013, related host computer performance button 5023, copy destination logical volume performance button 5033, and copy source logical volume performance 5043 in the resource performance information display area 5003 of this embodiment are used to display the performance information of the resource having performance correlation with the resource selected in the resource selection area 5001.

The screen displays shown in FIG. 28, FIG. 29, and FIG. 30 are merely examples, and separate screens may be displayed.

In the foregoing first embodiment and its first and second modified examples, the pursuit of finding the contents and cause of performance deterioration in the SAN was enabled by specifying, according to the copy configuration status, the performance correlation of the replication source volume as the copy source of the storage subsystem connected to the SAN and the performance information of the replication destination volume as the copy destination.

Figure 31:
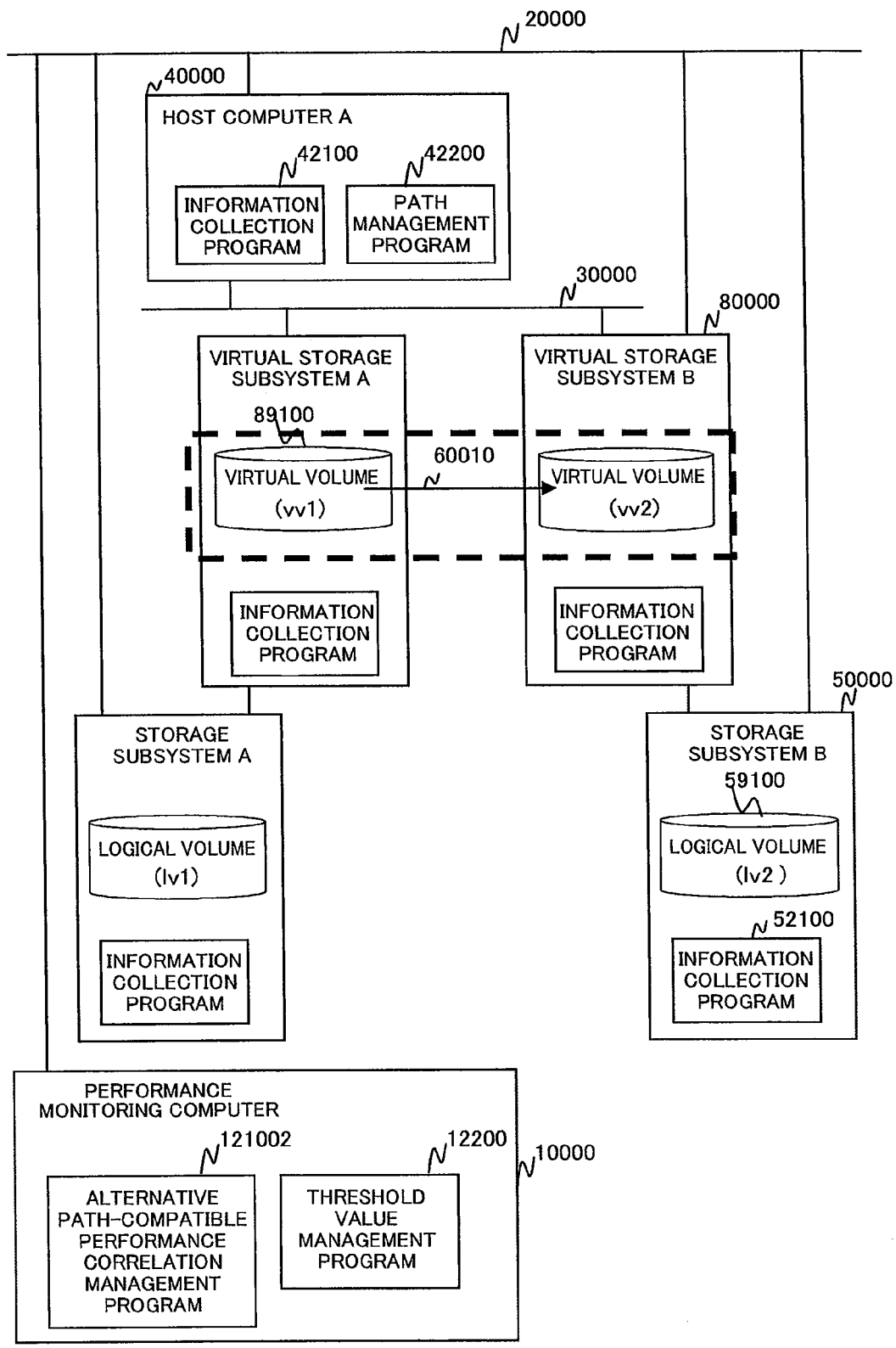
FIG. 31 is a diagram showing a configuration example of a computer system according to still another modified example of the present invention.

Subsequently, FIG. 31 shows a computer system configuration example of a third modified example of the first embodiment. This computer system comprises one or more host computers with an information collection program, two or more virtualized storage subsystems with an information collection program and retaining a copy function, one or more storage subsystems, and one or more performance monitoring computers with an alternative path-compatible performance correlation management program and a threshold value management program.

Here, a virtual storage subsystem refers to a storage subsystem with a virtualization function, which defines a virtual volume to be accessed from the host computer, and capable of providing the logical volume to become its entity in the virtual storage and in the storage subsystem. For the sake of convenience in the ensuing explanation, in this modified example, let it be assumed that one host computer (host computer A) 40000, two virtualized storage subsystems (virtualized storage A, virtualized storage subsystem B) 80000 retaining a copy function, and two storage subsystems (storage subsystem A, storage subsystem B) 50000 are mutually connected via a fibre channel 30000.

In this modified example, a virtual volume vv1 of the virtualized storage subsystem A and a virtual volume vv2 of the virtualized storage subsystem B are provided to the host computer A. The I/O from the host computer A to the virtual volume vv1 is sent to the virtual volume vv1 via the fibre channel 30000, and sent to the physical disk when the virtual volume vv1 corresponds to such physical disk in the virtualized storage subsystem. Further, when the virtual volume vv1 corresponds to the physical disk outside the storage subsystem, the I/O is sent to the logical volume lv1 of the storage subsystem A and the physical disk 59300 via the fibre channel 30000.

Here, a copy configuration definition 60010 is set between the virtual volume vv1 of the virtualized storage subsystem A and the virtual volume vv2 of the virtualized storage subsystem B based on the copy function. In this modified example, the type of copy configuration is synchronous copy and the status of copy configuration is a synchronized status, but the copy type may be either synchronous copy or asynchronous copy. In this embodiment, regardless of whether the copy type is synchronous or asynchronous, there is performance correlation between the logical volumes in which the copy configuration information is a synchronized status, and there is no performance correlation between the logical volumes in which the copy configuration information is a suspended status. Nevertheless, this limitation does not limit the application of the present invention.

Incidentally, the connection configuration of the host computer A, the virtualized storage subsystem A, the virtualized storage subsystem B, the storage subsystem A, and the storage subsystem B does not have to be a direct connection using the fibre channel 30000 as shown in FIG. 31, and may be connected via a network apparatus such as one or more fibre channel switches. Further, although the fibre channel 30000 was used in this embodiment for connecting the host computer A to the storage subsystem A and the virtualized storage subsystem A, the virtualized storage subsystem B, the storage subsystem A and the storage subsystem B, a separate network may be used so as long as it is a data communication network, and, for instance, an IP network may also be used.

The virtualized storage subsystem 80000 is configured the same as the configuration example of the storage subsystem 50000 shown in FIG. 4. Incidentally, when the virtualized storage subsystem is a virtualized apparatus such as a switch and will not be used as a storage subsystem, the virtualized apparatus 80000 does not have to be configured the same as the storage subsystem 50000. In other words, the virtualized apparatus will be of a configuration that does not comprise a disk apparatus configuring the volume for storing data.

Figure 32:
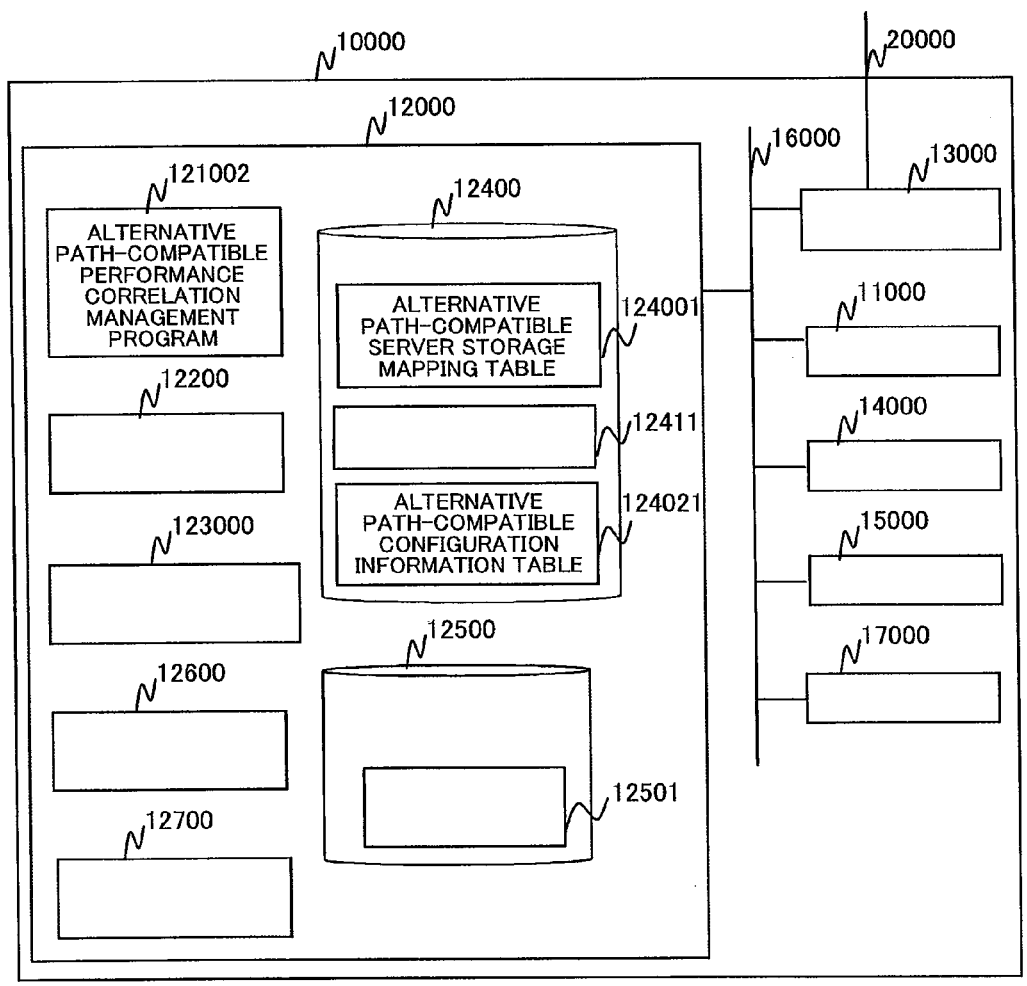
FIG. 32 is a diagram showing a configuration example of a performance monitoring computer according to still another modified example of the present invention.

FIG. 32 shows a configuration example of the performance monitoring computer 10000. The memory 12000 stores programs to be executed by the performance monitoring computer such as an alternative path-compatible performance correlation program 121002, a threshold value management program 12200, and the like. The remaining constituent elements are the same as FIG. 2, and hereby omitted.

Figure 33:
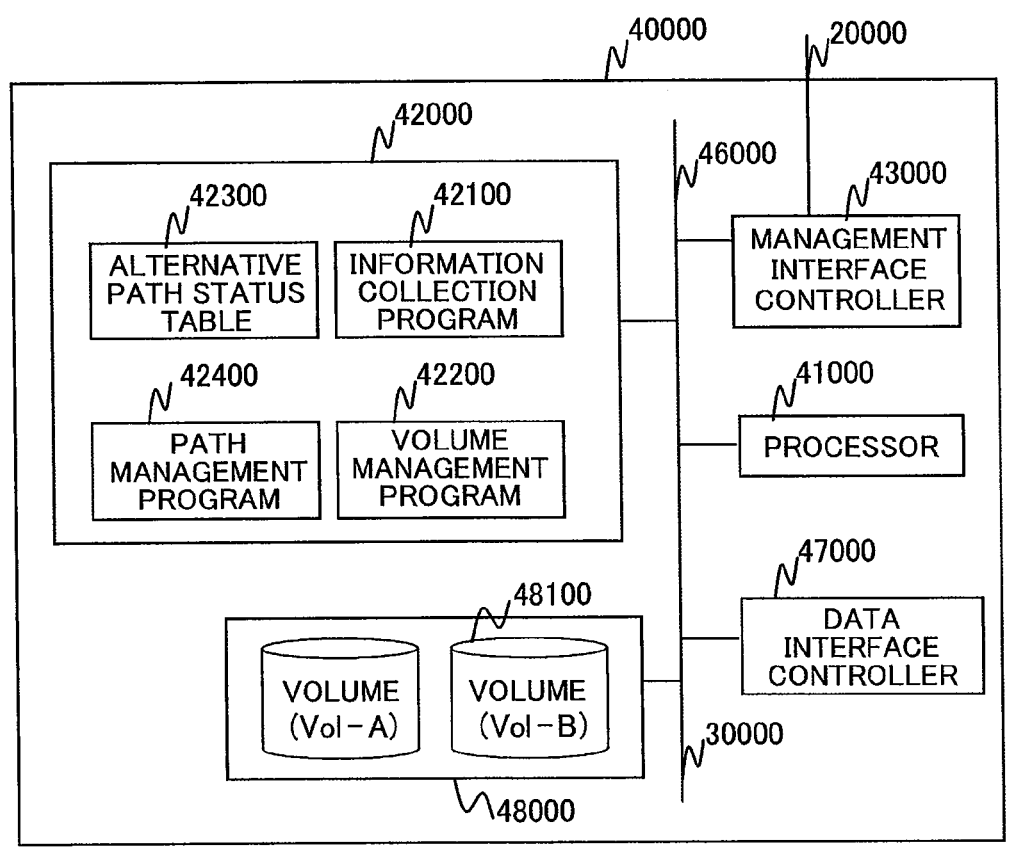
FIG. 33 is a diagram showing a configuration example of a host computer according to still another modified example of the present invention.

FIG. 33 shows a configuration example of the host computer 40000. The memory 42000 stores an information collection program 42100 as a program for sending and receiving management information and performance information of the host computer by communicating with the performance monitoring computer, a volume management program 42200 as a program for mounting the volumes made available from the storage subsystem 50000 in the host computer, a path management program 42300, and an alternative path status table retaining information on which paths among the alternative paths are of an active status. The volume management program 42200 mounts the logical volumes provided from the virtualized storage subsystem A on the volume 48100 in the memory module 48000 of the host computer A, and makes the logical volumes provided to the SAN available from the business program in the host computer A and from the storage subsystem A. Incidentally, although in this embodiment a case is explained where there is only one host computer; namely, the host computer A, and only one data interface controller in the host computer A, the number of host computers and the number of data interface controllers may be any number.

The path management program detects a failure that causes the network between the host computer A and the virtualized storage subsystem A to be inaccessible, or a failure that causes the virtualized storage subsystem A to stop, and performs processing for switching the transmission destination of the I/O from the virtualized storage A to the virtualized storage B without being aware of the business program in the host computer A.

FIG. 34 shows an example of an alternative path-compatible server storage mapping table 124001 to be stored in the configuration information repository 124000 retained by the performance monitoring computer 10000. This table stores information concerning each volume in each host computer as to which logical volume and which RAID group it corresponds to via which data interface of the virtualized storage subsystem. In the case of this modified example, entries of the same host computer name and same volume number also store information of alternative paths that are inactive in addition to the active paths. Since each piece of information to be stored is the same as the first embodiment, the explanation thereof is hereby omitted. In this modified example, although the same table configuration as the first embodiment was used, information showing the actual logical volume corresponding to the virtual volume and information showing the storage subsystem comprising the logical volume may also be added to the items of the table.

FIG. 35 shows an example of an alternative path-compatible configuration information table [124021] to be stored in the configuration information repository 124000 retained by the performance monitoring computer 10000. Each column of the alternative path-compatible configuration information table 124021 is a result of merging the respective columns of FIG. 34 and FIG. 6, and stores the same values. In the case of this modified example, entries of the same host computer name and same volume number also store information of alternative paths that are inactive in addition to the active paths. In this modified example, although the same table configuration as the first embodiment was used, information showing the actual logical volume corresponding to the virtual volume and information showing the storage subsystem comprising the logical volume may also be added to the items of the table.

FIG. 36 shows an example of an alternative path status table 42300 retained by the host computer 42000. This table lists the candidates of the I/O path from the host computer to the virtualized storage subsystem.

A value for uniquely identifying the host computer is registered in the host computer column 42301 of the alternative path status table 42300, a value for uniquely identifying the volumes in the host computer is registered in the volume number column 42302, a value for uniquely identifying the storage subsystems being used by the respective volumes of the volume number column is registered in the storage name column 42303, a value for uniquely identifying the numbers of the data interface being used by the respective volumes of the volume number column is registered in the data interface number column 42304, and a value for uniquely identifying the virtual volumes being used by the respective volumes of the volume number column is registered in the logical volume number column 42305.

Figure 37:
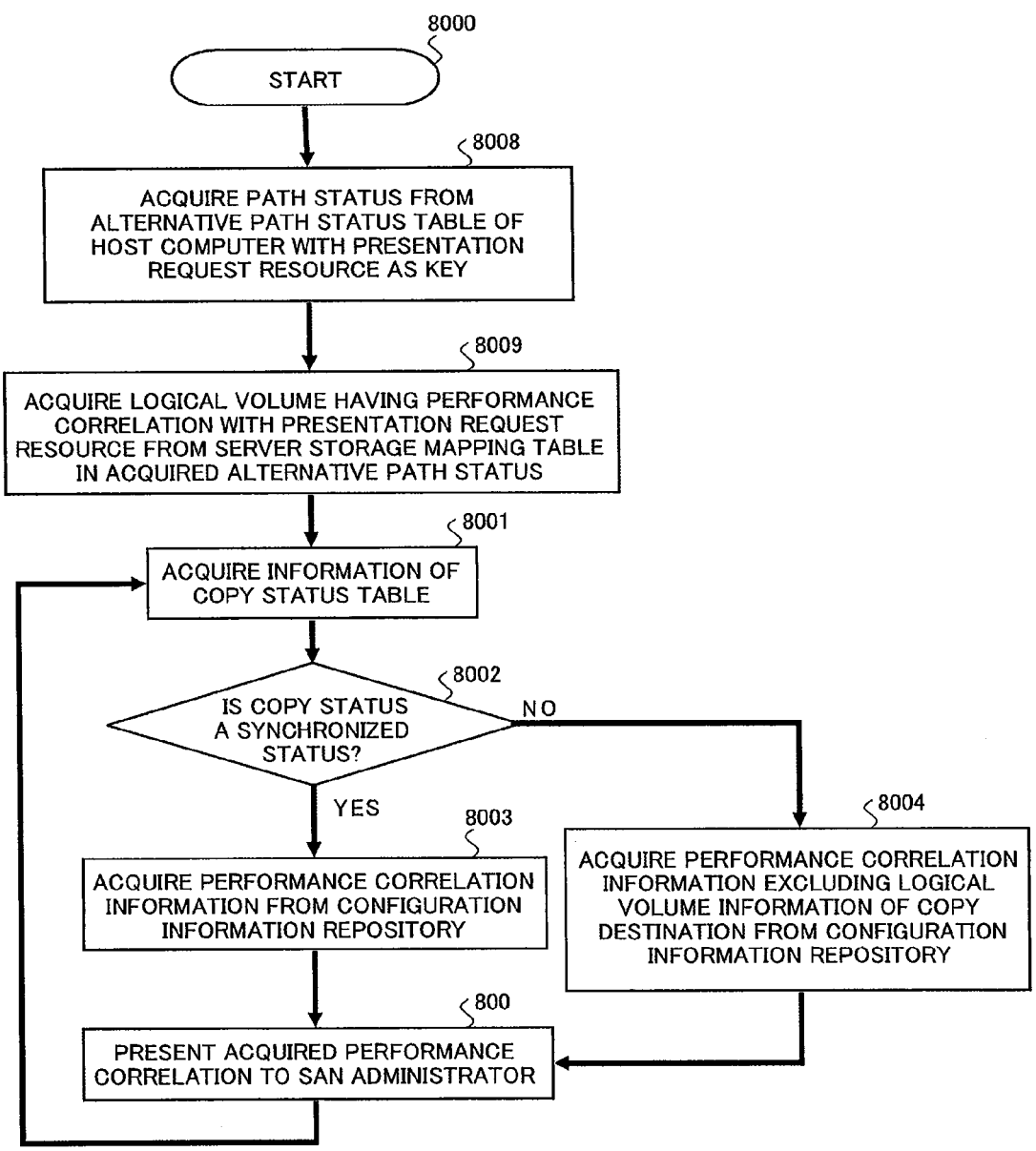
FIG. 37 is a flowchart showing an example of performance correlation management processing and performance correlation presentation processing of an alternative path-compatible performance correlation management program according to still another modified example of the present invention.

FIG. 37 shows a flowchart 8000 illustrating the performance correlation management processing and the performance correlation presentation processing to be executed by the alternative path-compatible performance correlation management program 121002. When the processor 11000 receives an operational status presentation request from the input module, at step 8008, it acquires the alternative path status table 42300 (FIG. 36) from the path management program via the network 20000 with the logical volume number 42305 (virtual volume is represented here) as the key (step 8008). Subsequently, the processor 11000 refers to the alternative path-compatible server storage mapping table from the volume number 42302 of the host computer of the acquired alternative path status, and acquires information (logical volume number 124006 in this case (virtual volume in this case)) concerning the logical volumes with performance correlation (step 8009). Since the logical volumes acquired at step 8009 are acquired with the same step as the processing of the first embodiment of the present invention, the explanation thereof is omitted.

Figure 38:
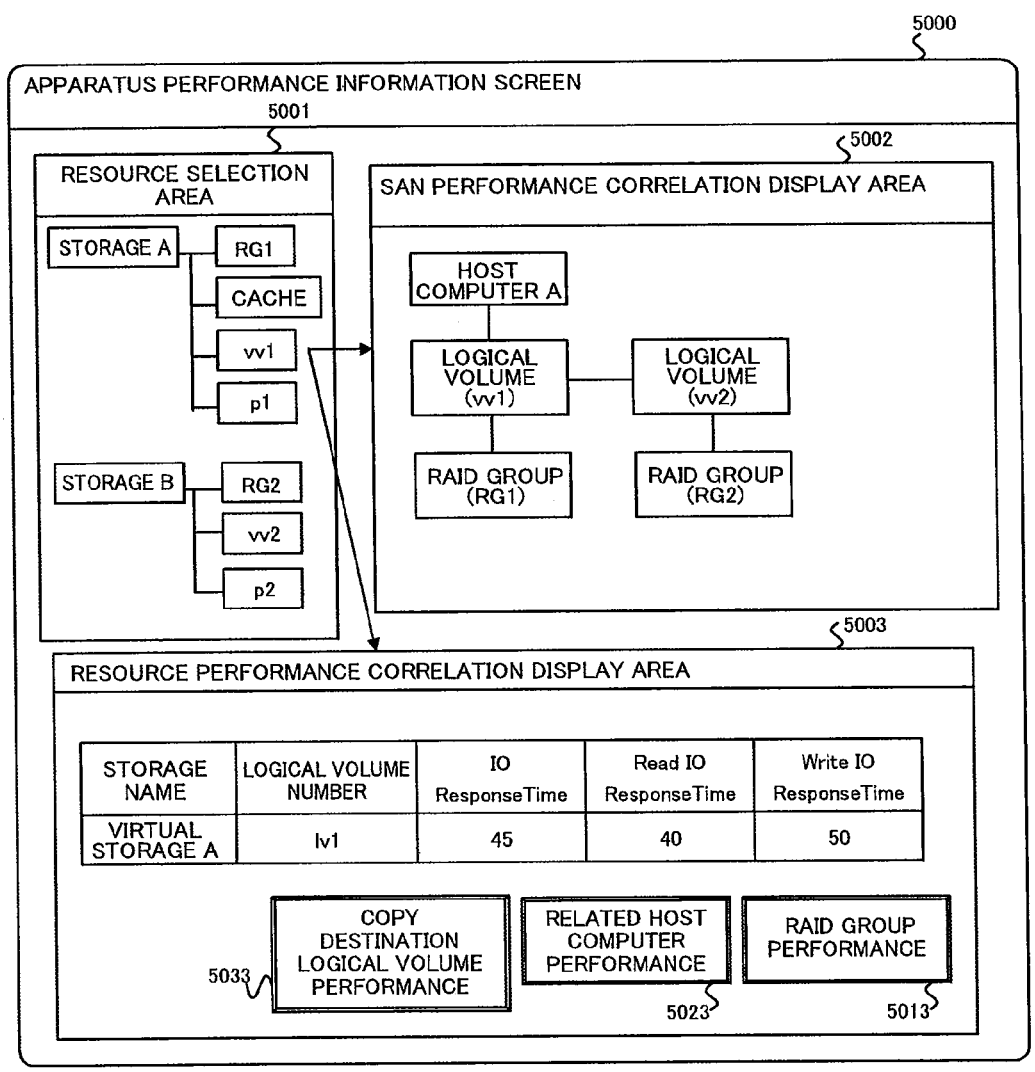
FIG. 38 is a diagram showing an example of a performance information screen according to still another modified example of the present invention.
Figure 39:
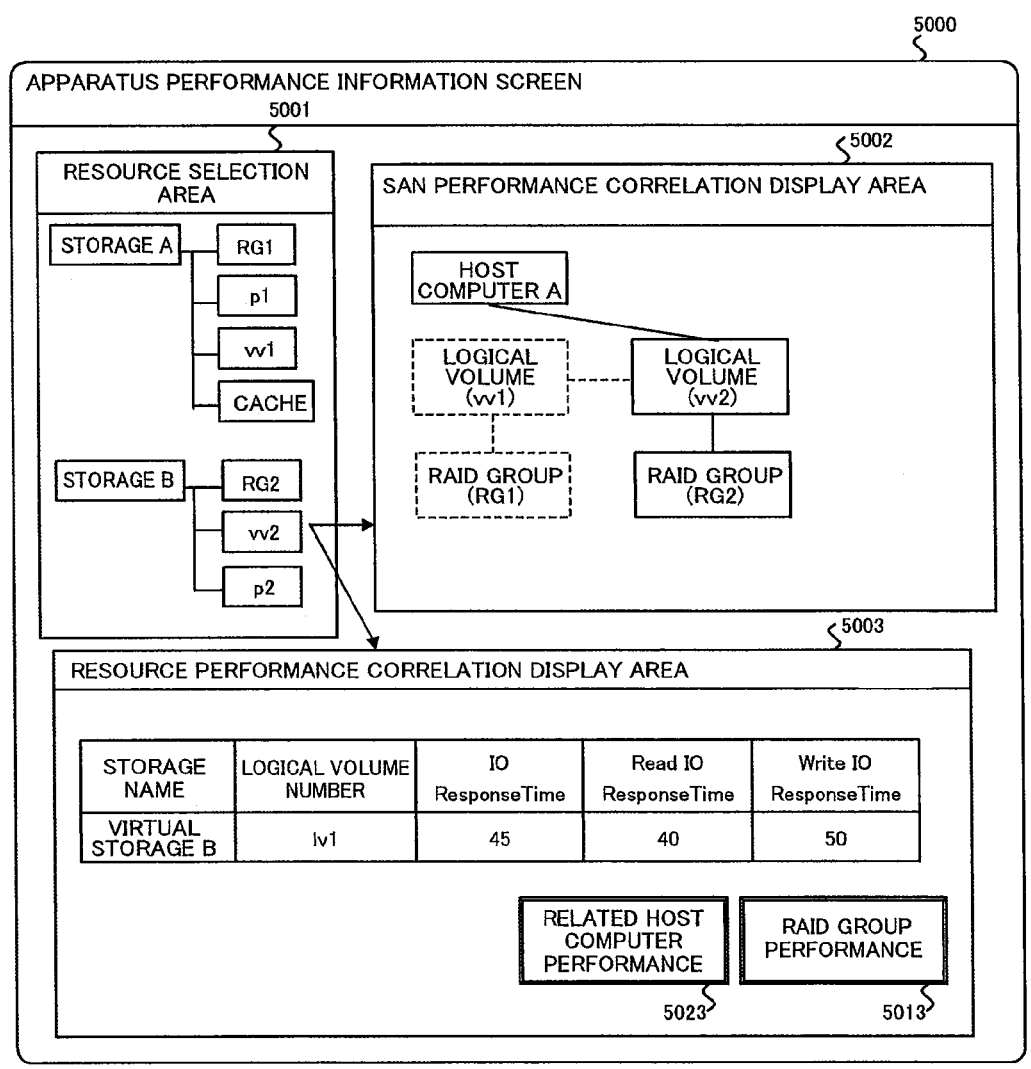
FIG. 39 is a diagram showing an example of a performance information screen according to still another modified example of the present invention.

In FIG. 38 and FIG. 39, the SAN performance correlation presentation screen 5002 displays information relating to the resource selected in the resource selection area 5001. In FIG. 38, a host computer A for mounting the virtual volume vv1, a RAID group RG1 as the physical storage area of the logical volume vv1, a logical volume vv2 in a copy configuration relationship with the logical volume vv1 and of a synchronized status, and a RAID group RG2 as the physical storage area of the logical volume vv2 are displayed. In FIG. 39, a host computer A for mounting the logical volume vv2, and a RAID group RG2 as the physical storage area of the logical volume vv2 are displayed. Here, the performance correlation displayed in FIG. 38 and the performance correlation displayed in the FIG. 39 are of an alternative path relationship.

In FIG. 39, the logical volume vv1 in a copy configuration relationship with the logical volume vv2 and of a suspended status, and the RAID group RG1 as the physical storage area of the logical volume vv1 are displayed as a grayout. In this modified example, although the logical volumes in a copy configuration relationship and of a suspended status and the RAID group as the physical storage area of the logical volumes are displayed as a grayout, for instance, other presentation methods may be used such as by showing that there is no performance correlation enabling the differentiation with the case of the synchronized status through non-display of the foregoing items.

The update of display is implemented according to the performance correlation presentation processing flow 8000 of the alternative path-compatible performance correlation management program. In FIG. 38 and FIG. 39, the performance information of the resource selected in the resource selection area 5001 is displayed in the resource performance information display area 5003. In this embodiment, performance information is acquired from the table 12501 showing the SAN performance information in the performance information repository and displayed with the selected resource as the key. The RAID group performance button 5013, related host computer performance button 5023, and copy destination logical volume performance button 5033 in the resource performance information display area 5003 of this embodiment are used for displaying the performance information of the resource having performance correlation with the resource selected in the resource selection area 5001.

In FIG. 39, although copy configuration information exists between the logical volume vv2 and the logical volume vv1, the copy configuration status is a suspended status and does not have performance correlation, and, therefore, the copy destination logical volume performance button 5033 is not displayed. In this modified example, in the case of the resource presented in the resource performance information display area 5003 and the resource in a copy configuration relationship and of a suspended status, the performance of the resource of the copy destination is not displayed. Nevertheless, presentation capable of showing that the performance correlation does not exist may also be implemented. The screen displays shown in FIG. 38 and FIG. 39 are merely examples, and separate screens may be displayed.

In this modified example, although the information collection programs are retained in the host computer and the storage subsystem, they may also be operated in a separate host computer to be used for executing the information collection programs.

The present invention disclosed herein is able to dynamically specify the performance correlation according to the alternative status and copy configuration status of the I/O path from the host computer to the virtualized storage subsystem and the storage subsystem. Based on the foregoing embodiments and modified examples, in addition to the data I/O path from the host computer to the storage subsystem, it is possible to grasp the performance deterioration of the related resource until the I/O response is returned to the host computer, and the administrative burden of the administrator can be alleviated thereby.

What is claimed is:

1. A computer system, comprising:
    a computer that includes a memory, an output module, and an input module;
    a first storage subsystem that is connected to the computer, includes a first logical volume for storing data, and transfers replicated data of data stored in the first logical volume; and
    a second storage subsystem that is connected to the computer and to the first storage subsystem, includes a second logical volume associated with the first logical volume as a copy pair mate and storing replicated data, and receives the replicated data from the first storage subsystem,
    wherein, the computer:
    acquires copy pair status information concerning the status of copy pair of the first logical volume and the second logical volume, and storing it in the memory;
    when receiving an operational status presentation request, refers to the memory and acquires, based on information indicating the copy pair status, a performance correlation between a plurality of resources from a management table stored in the memory; and
    displays information on the performance correlation between the resources on the output module based on the acquired information
    wherein said first storage subsystem comprises a first storage area and transfers replicated data of data stored in said first storage area;
    wherein said second storage subsystem connected to said first storage subsystem via a communication line comprises a second storage area and receives replicated data to be stored from said first storage subsystem to said second storage area;
    wherein said computer system further includes:
    a replication processing status referral unit for referring to a replication processing status of data of said first storage area and said second storage area to be associated;
    wherein said replication processing status referral unit refers to a replication processing status showing whether said replicated data has been transferred from said first storage subsystem to said second storage subsystem; and
    an output unit for outputting, when said first storage area is designated, first performance information concerning data I/O stored in said first storage area, and outputting second performance information concerning data I/O stored in said second storage area together with said first performance information upon said replicated data being in replication processing from said first storage area to said second storage area as a result of referring to said replication processing status, and
    wherein said output unit outputs second performance information concerning data I/O stored in said second storage area together with said first performance information when said replicated data is being transferred.

2. The computer system according to claim 1 wherein, the computer displays performance information of a plurality of resources that are correlated with each other, and does not display performance information of other resources that are not correlated with each other.

3. The computer system according to claim 1, further comprising:
    a correspondence specification unit for specifying a first storage area and a second storage area to be associated;
    wherein said output unit outputs a plurality of symbols representing said specified first storage area and second storage area.

4. The computer system according to claim 3, further comprising:
    an association display control unit for determining whether to associate and output symbols of said first storage area and symbols of said second storage area based on a replication processing status of data of said specified first storage area and said second storage area referred to by replication processing status referral unit;

wherein said output unit associates and outputs symbols of said first storage area and symbols of said second storage area when said replicated data is being subject to replication processing from said first storage subsystem to said second storage subsystem as a result of referring to said association display control unit.

5. The computer system according to claim 1, wherein at least one among the associated first storage area and second storage area exists in a plurality.

6. The computer system according to claim 1, wherein said first storage subsystem includes a physical storage device configuring said first storage area; and
a first network interface for accepting an I/O request to data stored in said first storage area;
wherein said second storage subsystem includes:
a second network interface for receiving said replicated data from said first storage subsystem and a physical storage device configuring said second storage area;
wherein said first performance information includes at least either information concerning said physical storage device configuring said first storage area or information concerning said first network interface; and
wherein said second performance information includes at least either information concerning said physical storage device configuring said second storage area or information concerning said second network interface.

7. The computer system according to claim 1, wherein said first storage subsystem includes a first memory for retaining replicated data to be stored in a second storage area to be associated with said first storage area together with a write sequence, and transfers said replicated data from said first memory to said second storage subsystem together with said write sequence;
wherein said second storage subsystem includes a second memory for retaining said replicated data received from said first storage subsystem together with said write sequence, and stores said replicated data in a second storage area according to said write sequence; and
wherein said replication processing status referral unit refers to said replication status including a data retention status of said first memory or a replicated data retention status of said second memory.

8. The computer system according to claim 1, further comprising:
a third storage subsystem associated with said second storage area, including a third storage area for storing replicated data of data to be stored in said second storage area, and connected to said second storage subsystem via a communication line;
wherein said replication processing status referral unit refers to a replication processing status of data of the second storage area and a third storage area to be associated; and
wherein said output unit outputs third performance information concerning data I/O stored in said second storage area together with said second performance information when said replicated data is being transferred from said first storage area to said second storage area as a result of referring to said replication processing status.

9. The computer system according to claim 1, further comprising:
a performance information collection unit for collecting said first performance information and said second performance information from said storage subsystem.

10. The computer system according to claim 1, wherein said output unit specifies a storage area accessible by said computer among the storage areas in said storage subsystem, and output performance information concerning an access path between said computer and said storage area.

* * * * *